United States Patent
Aydore et al.

(10) Patent No.: US 11,487,765 B1
(45) Date of Patent: Nov. 1, 2022

(54) GENERATING RELAXED SYNTHETIC DATA USING ADAPTIVE PROJECTION

(71) Applicant: Amazon Technologies, Inc., Seattle, WA (US)

(72) Inventors: Sergul Aydore, Brooklyn, NY (US); William Brown, Verona, WI (US); Michael Kearns, Philadelphia, PA (US); Krishnaram Kenthapadi, Sunnyvale, CA (US); Luca Melis, New York, NY (US); Aaron Roth, Philadelphia, PA (US); Amaresh Ankit Siva, Davidson, NC (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/360,981

(22) Filed: Jun. 28, 2021

Related U.S. Application Data

(60) Provisional application No. 63/148,091, filed on Feb. 10, 2021.

(51) Int. Cl.
  *G06F 16/00* (2019.01)
  *G06F 16/2455* (2019.01)
  *G06F 16/2458* (2019.01)

(52) U.S. Cl.
  CPC .... *G06F 16/24568* (2019.01); *G06F 16/2462* (2019.01)

(58) Field of Classification Search
  CPC .............. G06F 16/24568; G06F 16/2462
  USPC ........................................... 707/769
  See application file for complete search history.

(56) References Cited

U.S. PATENT DOCUMENTS

| | | |
|---|---|---|
| 11,151,447 B1 * | 10/2021 | Chen ............... G06F 16/211 |
| 2018/0349384 A1 * | 12/2018 | Nerurkar ........ G06F 16/24578 |

OTHER PUBLICATIONS

Acharya, J., et al. "Context-Aware Differential Privacy," Proceedings of the 37th Int'l Conf. on Machine Learning (2020), PMLR 119:52-62, 11 pages.

Bassily, R., et al. "Private Query Release Assisted by Public Data," Proceedings of the 37th Int'l Conf. on Machine Learning (2020), PMLR 119:695-703, 9 pages.

(Continued)

*Primary Examiner* — Chelcie L Daye
(74) *Attorney, Agent, or Firm* — Athorus, PLLC

(57) ABSTRACT

An algorithm releases answers to very large numbers of statistical queries, e.g., k-way marginals, subject to differential privacy. The algorithm answers queries on a private dataset using simple perturbation, and then attempts to find a synthetic dataset that most closely matches the noisy answers. The algorithm uses a continuous relaxation of the synthetic dataset domain which makes the projection loss differentiable, and allows the use of efficient machine learning optimization techniques and tooling. Rather than answering all queries up front, the algorithm makes judicious use of a privacy budget by iteratively and adaptively finding queries for which relaxed synthetic data has high error, and then repeating the projection. The algorithm is effective across a range of parameters and datasets, especially when a privacy budget is small or a query class is large.

20 Claims, 14 Drawing Sheets

(56) References Cited

OTHER PUBLICATIONS

Dwork, C. and Roth, A. "The Algorithmic Foundations of Differential Privacy," Foundations & Trends in Theoretical Computer Science, vol. 9, Nos. 3-4 (2014), pp. 211-407, 281 pages.

Phan, NH., et al. "Scalable Differential Privacy with Certified Robustness in Adversarial Learning," Proceedings of the 37th Int'l Conf. on Machine Learning (2020), PMLR 119:7683-7694, 12 pages.

Triastcyn, A. and Faltings, B., "Bayesian Differential Privacy for Machine Learning," Proceedings of the 37th Int'l Conf. on Machine Learning (2020), PMLR 119:9583-9592, 10 pages.

\* cited by examiner

160 ↘                                                                        ↙ 165

$q_1$   (STATE 07) ∩ (AGE 40-49) ∩ (FEMALE)           $a_1$ $q_2$   (STATE 47) ∩ (MALE) ∩ (HISTORY > \$5000)       $a_2$

•                                                      •
•                                                      •
•                                                      •

$q_m$   (FEMALE) ∩ (AGE 20-29) ∩ (HISTORY ≤ \$5000)    $a_m$ $Q = (q_1, q_2, \ldots q_m)$              $q = (q_1(D), q_2(D), \ldots q_m(D))$

ANSWER SELECTED QUERIES ON PRIVATE DATA

FIG. 1D

GENERATE "NOISY ANSWERS" BY PERTURBATION $\hat{a}_i = a_i + N(0, \sigma^2)$ FOR EACH $a_i$ 170          165

FIG. 1E

IDENTIFY DIFFERENTIABLE QUERY $\hat{q}_i$
FOR EACH SELECTED QUERY $q_i$ $$q_i : \mathcal{X} \to [0,1], \quad \hat{q}_i : \mathcal{X}^r \to \mathbb{R}$$

FIG. 1F

SEARCH FOR RELAXED SYNTHETIC DATASET D' BY
OPTIMIZATION OVER CONTINUOUS SPACE $$D' = \arg\min_{D'} \|q(D') - \hat{a}\|$$

GENERATING RELAXED SYNTHETIC DATA USING ADAPTIVE PROJECTION

CROSS-REFERENCE TO RELATED APPLICATIONS

This application claims priority to U.S. Patent Application No. 63/148,091, filed Feb. 10, 2021, the contents of which are incorporated by reference herein in their entirety.

BACKGROUND

One basic challenge in the context of differential privacy is to obtain answers to a large number m of statistical queries (e.g., linear queries, or counting queries) which have the form, "how many people in private dataset D have property P?" Additionally, marginal queries, or conjunctions, are directed to answering how many people in a private dataset have combinations of feature values, and are particularly useful cases in the context of differential privacy. Currently, one simple technique for privately answering queries is to compute each answer on the private dataset and then to perturb the results with noise. While useful for answering small numbers of queries, this technique may result in scaling errors defined as functions of the number m of statistical queries and a size n of the private dataset D.

Recently, it has been understood that large numbers of queries may be privately and accurately answered by encoding the answers in a synthetic dataset. Synthetic datasets may not only represent answers to large numbers of queries but also permit queries other than those that have been expressly answered to be evaluated, or to take advantage of generalization properties. Improving upon the accuracy of simple perturbation may be computationally challenging, however. Moreover, constructing synthetic datasets is difficult even when it is possible to accurately answer simple classes of queries with simple perturbation, such as a set of marginal queries that are restricted to two of d binary features.

BRIEF DESCRIPTION OF THE DRAWINGS

FIGS. 1A through 1G are views of aspects of one system for synthetic data generation in accordance with embodiments of the present disclosure.

DETAILED DESCRIPTION

Figure 1A:
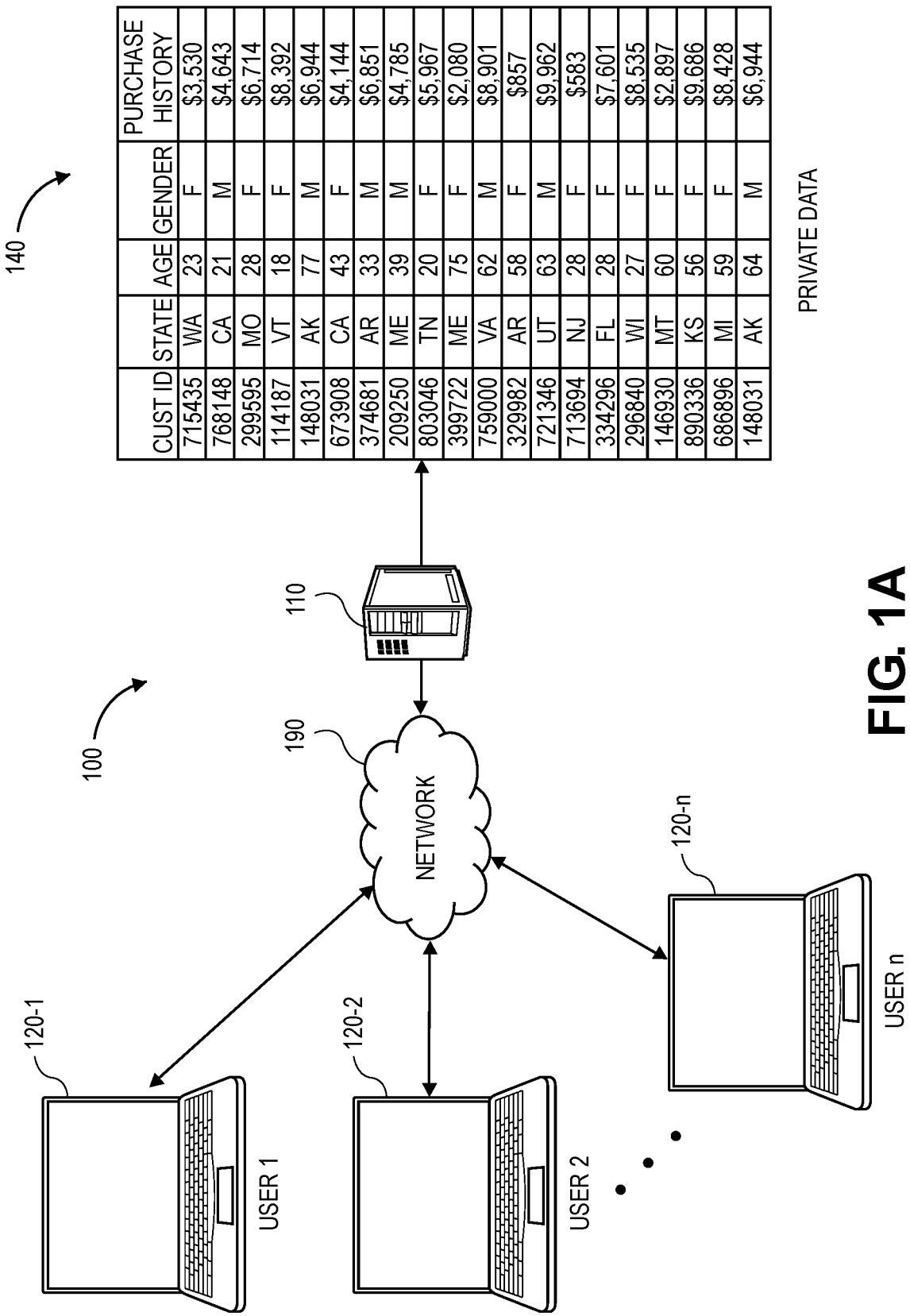

As is set forth in greater detail below, the present disclosure is directed to generating synthetic datasets. More specifically, systems and methods of the present disclosure are directed to generating synthetic versions of private data (e.g., sensitive data) while preserving the value of the private data for use in analysis, predictive modeling, or any other applications. Synthetic data generated in accordance with implementations of the present disclosure may be used to release answers to any number of queries, such as statistical queries or k-way marginal queries, subject to differential privacy. In some implementations, queries may be answered on private data using simple perturbation, e.g., random perturbation, Gaussian perturbation, Laplacian perturbation, Poisson perturbation, or others, and a synthetic dataset that most closely matches the perturbed answers may be identified by a continuously relaxed projection mechanism.

The present disclosure provides a number of advantages over existing systems and methods. First, relaxing a space of datasets to a continuous space, and generalizing statistical queries to be considered to be differentiable over this space, enables the use of any number of standard optimization tools (e.g., auto-differentiation tools or optimizers) to identify a synthetic dataset that, when run on the queries, results in values that are nearest to "noisy" (or perturbed) answers to such queries obtained by running the queries on the private dataset. Second, by relaxing a domain of a synthetic dataset to a continuous space, queries for which the synthetic dataset has high errors or variances with respect to noisy answers obtained for such queries may be identified iteratively, and a projection may be repeated over time while making judicious use of a privacy budget. In some implementations, after a relaxed synthetic dataset is derived, an actual synthetic dataset may be derived from the relaxed synthetic dataset by randomized rounding, by normalization, or by any other technique.

In accordance with implementations of the present disclosure, privatized versions of sensitive data may be shared with one or more external (or third party) services for analysis or machine learning without subjecting any of the data to privacy loss. For example, where sensitive data includes personally identifiable information, or "PII," privatized versions of the sensitive data (e.g., synthetic data) may be utilized for any purpose, and the individuals represented in the sensitive data may not be reidentified.

Moreover, sensitive data may be privatized in a manner that maintains correlations between patterns represented in the sensitive data, thereby enabling users of privatized versions of the sensitive data to securely perform analytics on the data, or to perform any other functions on the sensitive data, e.g., analysis and visualization, or designing, developing, debugging, training or iterating machine learning models using the synthetic data, which may share statistical properties with the original data but not identical records. Owners of sensitive data may use the privatized versions to make sound and efficient business decisions, based on the sensitive data, without risking a breach of privacy.

Referring to FIGS. 1A through 1G, views of aspects of one system for synthetic data generation in accordance with embodiments of the present disclosure are shown. As is shown in FIG. 1A, the system 100 includes a primary computer system 110 (e.g., a computer server or other system or device) connected to a plurality of secondary computer systems 120-1, 120-2 ... 120-$n$ over one or more networks 190, which may include the Internet, in whole or in part. The primary computer system 110 receives information or data (e.g., private data, or sensitive data) from the secondary computer systems 120-1, 120-2 ... 120-$n$ over the one or more networks 190. The primary computer system 110 stores the information or data received from the secondary computer systems 120-1, 120-2 ... 120-$n$ in a private dataset 140.

The secondary computer systems 120-1, 120-2 ... 120-$n$ may be one or more tablet computers, laptop computers, desktop computers, mobile devices (e.g., smartphones), wristwatches, smart speakers, or other computer devices or systems, such as computer devices or systems associated with entities that own or control private data (e.g., customers, patients, users, individuals, or other owners of data). The private dataset 140 may be received and stored in any format, such as in one or more text files, Comma-Separated Value (or ".CSV") files, Protocol Buffer (or "protobuf," or ".proto") files, JavaScript Object Notation (or ".JSON") files, JSON Lines files, or others.

The private dataset 140 includes a plurality of columns or other sets of data representing the entities, including but not limited to identifiers of locations, ages, genders or purchase histories associated with such entities.

Figure 1B:
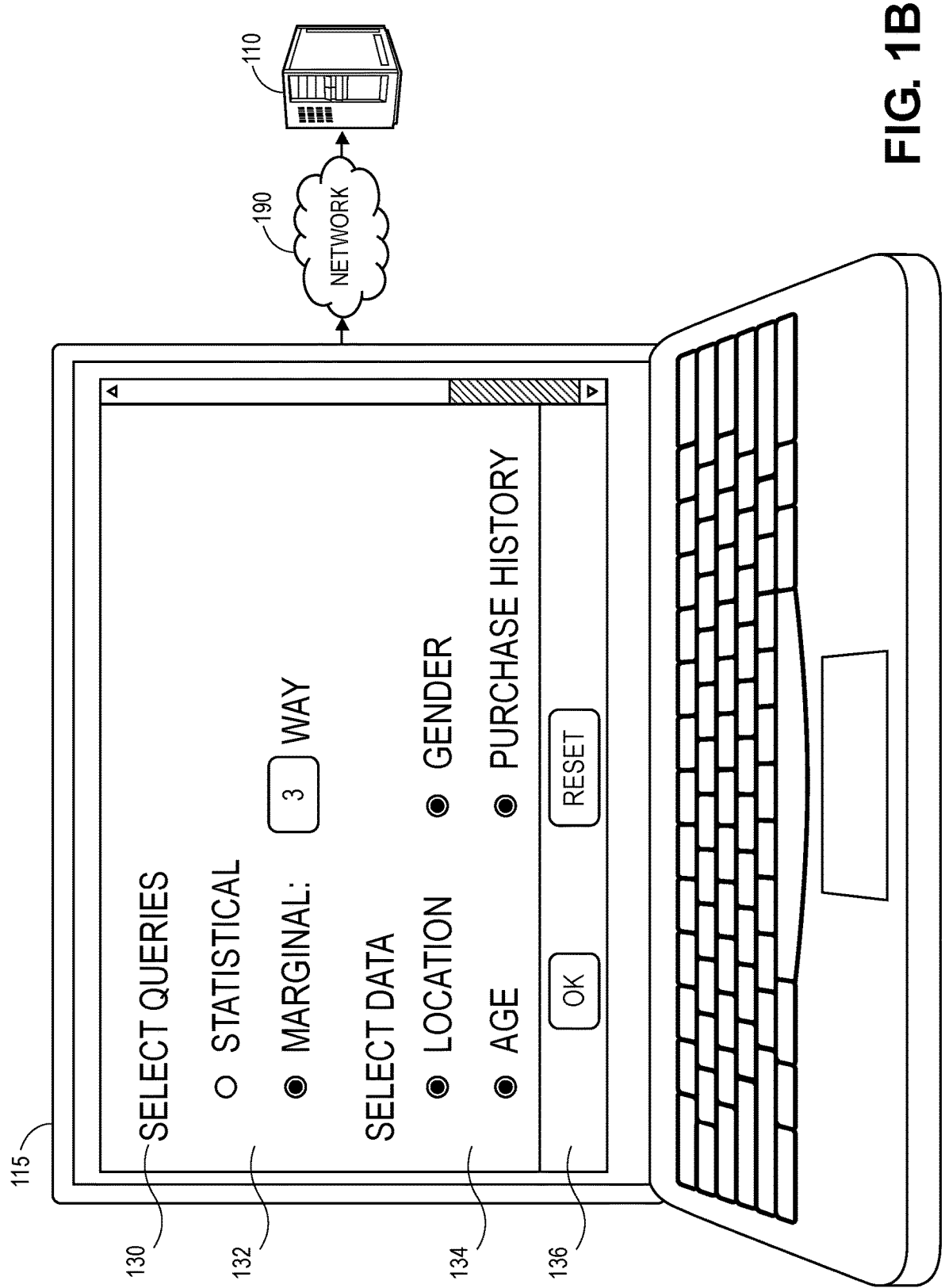

As is shown in FIG. 1B, a user interface 130 is displayed by a workstation 115 in communication with the primary computer system 110. For example, the user interface 130 may be a page (e.g., a web page, a network page, or a page of a dedicated application) shown on a monitor or other display of the workstation 115 or the primary computer system 110. The user interface 130 includes a first section 132 including a number of interactive elements that enable a user to select one or more queries, or a class of queries, to be run on the private dataset 140. As is shown in FIG. 1B, the first section 132 includes one or more radio buttons or one or more text boxes for selecting statistical queries or marginal queries, e.g., k-way marginal queries, where k is an integer greater than one, as well as specifying a number of features, columns or other sets of the private dataset 140 to be considered in answering a marginal query, e.g., a value of k. Alternatively, the first section 132 may include elements for receiving selections of specific statistical queries to be answered, or from which one or more marginal queries may be formed.

A second section 134 of the user interface 130 includes one or more radio buttons or other elements for selecting the columns or other sets of the private data 140 to be considered in answering marginal queries. A third section 136 of the user interface 130 includes a number of buttons or selectable elements that enable a user to confirm a selection of one or more classes of queries, to reset any of such selections, or to take any other action with respect to queries shown or selected in the first section 132. Users of the user interface 130 may make selections of queries or take any actions with respect to such selections in any manner, and by way of any input/output ("I/O") devices, including but not limited to a mouse, a stylus, a touchscreen, a keyboard, a trackball, a trackpad, or any voice-controlled devices or software (e.g., a personal assistant).

The user interface 130 may include any elements for identifying attributes or classes of queries, as well as any checkboxes, drop-down lists, list boxes, toggles, pickers, search fields, tags, sliders, icons, carousels, or any other elements not shown in FIG. 1B. Alternatively, the user interface 130 may take any other form. For example, in some implementations, the first section 132, the second section 134, the third section 136, or any other sections, may be provided on two or more pages. Likewise, alternatively, the user interface 130 need not be displayed by the workstation 115, and may instead be presented to one or more users via any other computer device or system, including the primary computer system 110 or one or more of the secondary computer systems 120-1, 120-2 . . . 120-n.

Figure 1C:
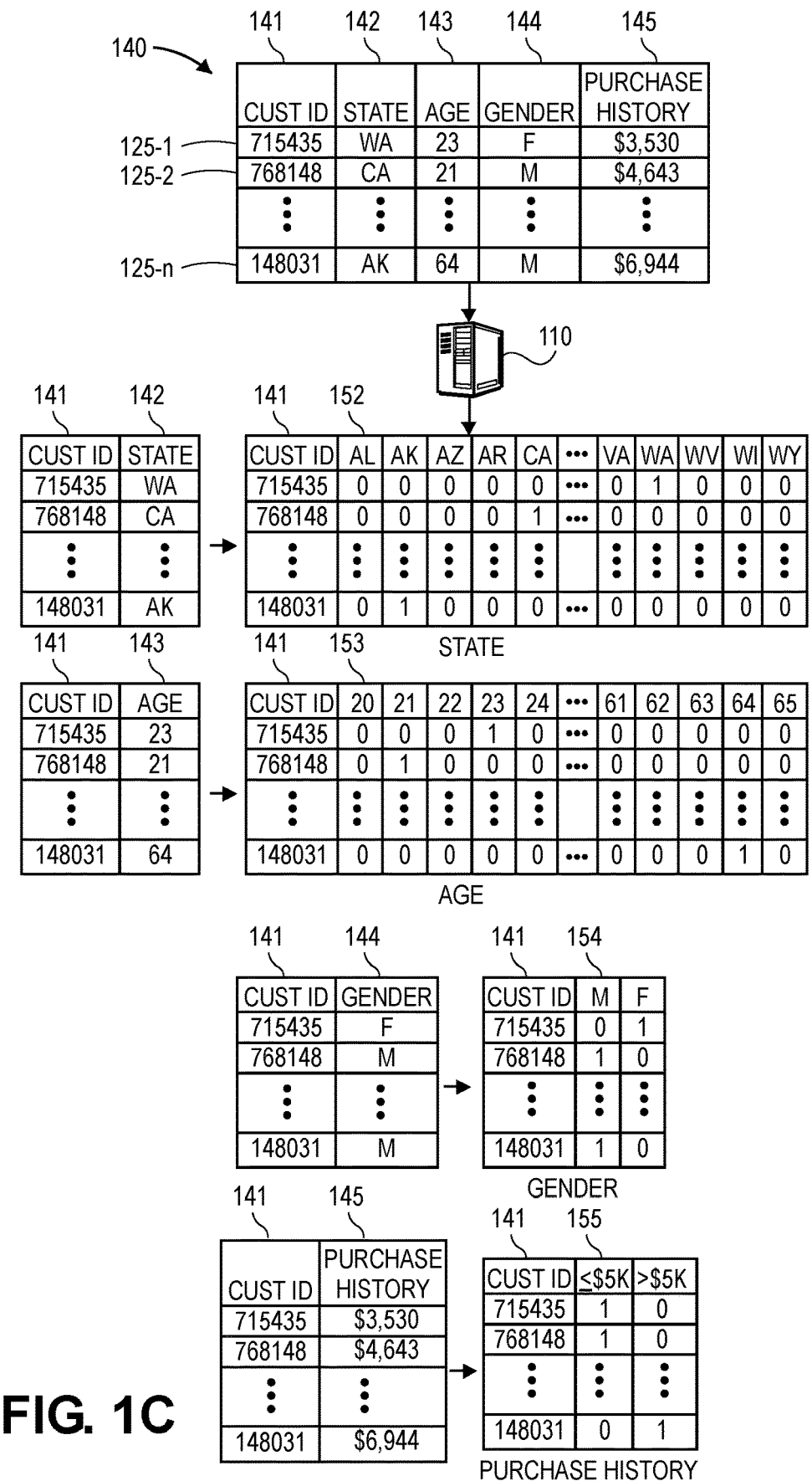

As is shown in FIG. 1C, the private dataset 140 includes a set of features 141, 142, 143, 144, 145, including identifiers 141 of entities (e.g., customers, patients, users, individuals, or other owners of data), states (or other geographic entities) 142 where such entities are located, ages 143 of the entities, genders 144 of the entities, and purchase histories 145 of the entities. Alternatively, or additionally, the private dataset 140 may include any other information or data regarding the entities, including information regarding their personal backgrounds (such as marital statuses, military service data, races or ethnicities, locations previously lived, educational histories or other information), or any other personal data (such as incomes, assets, or other financial metrics) that may be considered private, or that such entities may wish to maintain in a private manner. For example, in some implementations, the private dataset 140 may include medical or health information regarding a plurality of individuals, or any other private or sensitive data.

Moreover, as is also shown in FIG. 1C, prior to answering one or more queries or classes of queries selected by the user as shown in FIG. 1B, the private dataset 140 may be pre-processed or otherwise transformed. In some implementations, where the private dataset 140 includes categorical features or variables, e.g., statistical data that may be divided into a predetermined number of groups, such as the states 142, the ages 143, the genders 144, the purchase histories 145, or any other data, such features or variables may be converted from a categorical form into a binary form. For example, in some implementations, categorical features may be embedded into binary features, e.g., by a one-hot encoding. Each of the categorical features may be replaced with a number of binary features for each data point within a domain, such that just one of the binary features is set to a value of one for any particular data point within the domain, and each of the other binary features is set to a value of zero. As is shown in FIG. 1C, the states 142 of the entities, which are expressed by abbreviations or postal codes in the private dataset 140, are each embedded into a set 152 of fifty binary features. For each entity, one of the binary features of the set 152 corresponding to a state in which an individual is located has a value of one, and each of the other binary features of the set 152 has a value of zero.

Similarly, the ages 143 of the entities, which are expressed in numbers ranging from twenty to sixty-five in the private dataset 140, are each embedded into a set 153 of forty-six binary features. For each entity, one of the binary features of the set 153 corresponding to an age (in years) of an individual has a value of one, and each of the other binary features of the set 153 has a value of zero. The genders 144 of the entities, which are expressed by either an "M" for males or an "F" for females in the private dataset 140, are each embedded into a set 154 of two binary features. For each entity, one of the binary features of the set 154 corresponding to a gender of the entity, e.g., male or female, has a value of one, and the other of the binary features of the set 153 corresponding to the other gender has a value of zero. Likewise, the purchase histories 145 of the entities, which are expressed in various dollar values, are each embedded into a set 155 of two binary features, viz., whether the purchase history is less than or equal to, or greater than, five thousand dollars. For each entity, one of the binary features of the set 155 has a value of one, and the other of the binary features of the set 155 has a value of zero. Alternatively, the private dataset 140 may be preprocessed or transformed in any other manner. For example, in some implementations, one or more of the features 141, 142, 143, 144, 145 of the private dataset 140 need not be transformed, encoded or embedded into binary features, either according to a one-hot encoding, or in any other manner.

As is shown in FIG. 1D, after categorical features of the private dataset 140 have been preprocessed into binary features, e.g., by a one-hot encoding, one or more queries in a class of queries selected by the user may be answered based on the private dataset 140. For example, a set 160 of queries $Q=(q_1, q_2 \ldots q_m)$ in a class of queries selected by the user, viz., three-way marginal queries is shown. The set 160 of queries includes a marginal query $q_1$ for determining a number of all customers located in State 07 (e.g., Connecticut) who are between the ages of forty and forty-nine and are female, as well as a marginal query $q_2$ for determining a number of all customers located in State 47 (e.g., Washington) who are male and have a purchasing history greater than five thousand dollars, and a marginal query $q_m$ for determining a number of all customers who are female and between the ages of twenty and twenty-nine who have a purchasing history of less than or equal to five thousand dollars, or any other queries. As is further shown in FIG. 1D, a vector 165 of answers $a=(q_1(D), q_2(D) \ldots q_m(D))$ to each of the queries of the set 160 may be determined based on the private dataset 140.

As is shown in FIG. 1E, a vector 170 of "noisy" answers â may be generated by perturbing each of the answers a of the vector 165. For example, in some implementations, noise in the form of a Gaussian distribution defined as a function of one or more privacy parameters, e.g., a Gaussian distribution $N(0, \sigma^2)$, may be added to each of the answers $a_i$ of the vector 165 to define the vector 170 of the noisy answers â. Alternatively, in some implementations, the vector 165 of answers may be perturbed in any other manner, such as at random, by a Laplacian operator, by a Poisson process, or by any other technique.

As is shown in FIG. 1F, differentiable queries $\hat{q}_i$ are identified for each of the queries $Q=(q_1, q_2 \ldots q_m)$ of the set 160. For example, the differentiable queries $\hat{q}_i$ may be equivalent extended differentiable queries for each of the queries Q, and may be identified subject to two properties. First, each of the differentiable queries $\hat{q}_i$ may be differentiable over a continuous space $X^r$, such that for every value x of the continuous space $X^r$, a gradient $\nabla q_i(x)$ is defined. Second, each of the differentiable queries $\hat{q}_i$ has an answer that agrees with an answer to the query $q_1$ on every binary value resulting from a one-hot encoding.

As is shown in FIG. 1G, a synthetic dataset 175, or D', is defined by arguments of a minimum of differences between answers to the set 160 of queries determined from an initial synthetic dataset and the vector 170 of the noisy answers a determined from the private dataset 140 and subsequent perturbation.

In some implementations, the synthetic dataset 175 may be identified based on each of the queries of the set 160 and each of the noisy answers a of the vector 170 calculated based on the private dataset 140 and perturbed, e.g., according to the simple Gaussian perturbation. In some other implementations, however, the synthetic dataset 175 may be identified based on a subset of the queries of the set 160, and corresponding noisy answers for the subset of the queries. Moreover, because the projection mechanism is relaxed across the domain of the dataset, the synthetic dataset 175 may have values across a continuous space for each of the features, and are not limited to binary values, e.g., 0 or 1. For example, a feature such as gender, which is typically referenced in a binary fashion, such as is shown in FIG. 1C, and is represented as such in the private dataset 140, may instead be represented within the synthetic dataset 175 with continuous values between other than zero or one, including both negative and positive values.

In some implementations, such as those discussed below with regard to FIGS. 3A through 3E and FIGS. 4A and 4B, the synthetic dataset 175 may be determined by adaptively projecting the synthetic dataset across a continuous space. For example, a predetermined number of queries having greatest distances between answers obtained based on a previous version or incarnation of the synthetic dataset, and noisy answers obtained using the original dataset and perturbed with noise, may be identified. The synthetic dataset may be updated by iteration, and by relaxing a projection of the predetermined number of queries.

Additionally, in some implementations, where a synthetic dataset 175 is relaxed, e.g., obtained by a relaxed projection mechanism, an actual synthetic dataset may be obtained based on the synthetic dataset 175. For example, in some implementations, an actual synthetic dataset may be obtained by randomized rounding of a relaxed synthetic dataset. In some other implementations, the actual synthetic dataset may be obtained by normalizing the relaxed synthetic dataset, e.g., to values having a range between zero and one, interpreting each of the normalized values as probabilities, and selecting one of the values at random, based on the probabilities. Alternatively, an actual synthetic dataset may be obtained or otherwise derived from a relaxed synthetic dataset in any other manner.

One basic problem in differential privacy is to accurately answer a large number of statistical queries, e.g., linear queries, counting queries or marginal queries. One technique for answering such queries is to compute answers to each of the queries on the private dataset, and then perturb the computed answers with independent Gaussian noise. Where a dataset has a size n, an error scaling of the dataset may be a function of a ratio of a square root of the number m of queries to the size n of the dataset.

Perturbing computed answers to queries on a sensitive dataset is useful, particularly where the queries are small in number. One alternative option for privately and accurately answering queries that are large in number is to encode such answers using a synthetic dataset. Synthetic datasets are one concise way of representing answers to large numbers of queries. Synthetic datasets also permit owners of the data to evaluate queries other than those that have been explicitly answered using the sensitive data, and to take advantage of generalization.

Unfortunately, improving upon errors in simple perturbation techniques, such as one or more Gaussian, Laplacian or Poisson techniques, may be computationally difficult. Furthermore, constructing synthetic datasets is also challenging, even when computing accurate answers with simple perturbation is possible for simple classes of queries, such as a set of all marginal queries that are restricted to two out of d binary features (e.g., k-way marginals such as 2-way marginals). Therefore, differentially private algorithms that may provably answer large numbers of statistical queries, or generate interesting synthetic data in polynomial time, are difficult to come by.

The systems and methods of the present disclosure are directed to identifying or generating synthetic datasets that mimic sensitive datasets, and satisfy privacy guarantees with respect to the sensitive datasets, while meeting utility guarantees of statistics that are to be preserved, e.g., according to a relaxed projection mechanism. In some implementations, a number of queries may be run on each of the values of an original dataset, e.g., a sensitive dataset, or a private dataset. Answers calculated for each of the queries on each of the values of the original dataset may then be perturbed by or otherwise subjected to noise, e.g., by a Gaussian mechanism, a Laplacian mechanism, a Poisson mechanism, or any other mechanism. A synthetic dataset that, when run on the queries, most closely matches "noisy" answers that were determined by running queries on the original dataset and subsequently perturbing the answers may then be identified. For example, in some implementations, a synthetic dataset may be identified initially in a random manner, or in any other manner, and each of the queries may be run on the synthetic dataset. Distances (e.g., differences) between answers obtained by running queries on the synthetic dataset, and the noisy answers obtained using the original dataset and modified by noise may be determined, and the distances may be used to adjust the synthetic dataset according to any differential optimization technique, e.g., a stochastic gradient descent, or by any algorithm. The process may be repeated any number of times until distances between answers to the queries determined based on the synthetic dataset and the noisy answers are minimized. The synthetic dataset may then be utilized in any manner and for any purpose for which analysis or processing of the original dataset may have been desired.

In some implementations, a predetermined number of queries may be run on a subset of the values of an original dataset, e.g., according to a relaxed adaptive projection mechanism. Answers calculated for the predetermined number of queries on a subset of the values of the original dataset may then be perturbed by or otherwise subjected to noise. A synthetic dataset may be identified initially in a random manner, or in any other manner, and each of the predetermined number of queries may be run on the synthetic dataset. The predetermined number of queries may include fewer than a total number of queries, e.g., a significantly smaller number of the queries. In some implementations, distances (e.g., differences) between answers obtained by running the predetermined number of queries on the synthetic dataset, and the noisy answers obtained using the original dataset and modified by noise may be determined, and the distances may be used to adjust the synthetic dataset according to any differential optimization technique. For example, a predetermined number of the queries having the greatest distances between the answers obtained based on a previous version or incarnation of the synthetic dataset, and the noisy answers obtained using the original dataset and modified by noise, may be identified. The synthetic dataset may be updated based on a relaxed projection of the predetermined number of queries, i.e., a dataset for which answers to the predetermined number of queries are nearest the noisy answers to the same queries as determined from the original dataset.

In some embodiments, an algorithm receives user inputs of information or data to one or more computer systems programmatically, e.g., through an application programming interface, or via a graphical user interface. The information or data inputted by the user may include one or more files, or locations of files or data for which synthetic versions are desired. The information or data inputted by the user may also include a query class for which the user wishes to preserve statistics. For example, the class may be a custom query class defined by the user, which may be provided in code or through specification, or chosen from a set of one or more pre-defined query classes (e.g., linear threshold functions, k-way marginals, or others). A query class may be provided in differentiable form.

Additionally, the information or data inputted by the user may include a privacy level or budget, according to any notion of differential privacy, with which an addition of noise may be calibrated. The information or data inputted by the user may also include a configuration detailing information about a dataset that may be "best-guessed," if the information is not provided. The information or data inputted by the user may further include parameters for an algorithm, e.g., a top number q of queries to select per epoch, a number of epochs, a learning rate, a number of iterations, or others.

Next, in some embodiments, the algorithm may pre-process a dataset using a user-provided or a "best-guess" configuration. For example, where a private dataset is expressed with categorical features or variables, the categorical features or variables may be embedded in binary features, e.g., by a one-hot encoding. Then, in some embodiments, for each epoch, the algorithm may initialize a synthetic dataset randomly, or based on a parameter selected by the user.

For each epoch, the algorithm may evaluate queries against a synthetic dataset and an input dataset, and the worst, or most erroneous, queries may be selected (e.g., privately or otherwise). The algorithm may also answer the worst, or most erroneous, queries privately and such answers may be perturbed, e.g., by a Gaussian mechanism, a Laplace mechanism, a Poisson mechanism, or in any other manner. The algorithm may use any gradient descent method to optimize the synthetic dataset, or to minimize the error against the selected queries, for any number of iterations.

Finally, in some embodiments, the algorithm may output the synthetic dataset to a desired location.

An algorithm may be run in any physical or virtual location, device or machine, e.g., in the "cloud," or by one or more desktop computers, laptop computer, mobile devices (such as tablet computers or smartphones), or any other devices or machines, in accordance with embodiments of the present disclosure. Additionally, in some embodiments, the algorithm may be run in a secure enclave.

The algorithm may also be provided in any type or form of software or other sets of instructions or data. For example, the algorithm may be provided in text, in a .CSV file, Protobuf, JSON, JSONLines, or others, which may be maintained locally or in a cloud-based machine. The algorithm may also use any auto-differentiation framework, such as JAX, PyTorch, MXNet, TensorFlow, or others.

In some embodiments, a user interface may be programmatic or based in a graphical user interface. Additionally, communication with a user interface may be stateless or stateful with respect to a privacy level or budget tracking. For a stateless interface, a user would be required to take care to ensure that the algorithm remained within a privacy budget, or a privacy budget policy. In a stateful interface, access and a privacy level could be handled or maintained by such a system.

The systems and methods of the present disclosure provide a number of advantages over prior art systems or methods for maintaining differential privacy. For example, one or more of the systems and methods described herein are simple, fast, and effective in preserving the privacy of sensitive data. Because the systems and methods of the present disclosure operate based on "noisy" answers, or answers that have been perturbed with noise, privacy of the sensitive data is ensured.

Furthermore, the systems and methods of the present disclosure enable users to specifically select statistics, or classes of statistics, such as marginal queries, that are to be analyzed with respect to the synthetic data. Moreover, users of the systems and methods described herein are able to select one or more factors relating to a privacy budget, including but not limited to privacy loss parameters, failure probability parameters, or others, as well as hyperparameters for relaxing projections, including but not limited to numbers of adaptive rounds, numbers of queries considered in each round, or sizes of the synthetic datasets. In some implementations, the privacy budget may be large, such as where the original dataset includes personal data subject to protections of one or more laws or regulations such as the Health Insurance Portability and Accountability Act of 1996 (or "HIPAA"), a user may ensure that privacy is maintained by selecting hyperparameters accordingly. In some other implementations, where the privacy requirements imposed by laws, regulations or other authorities are not as strict, a lower privacy budget may be maintained, and hyperparameters may be selected accordingly.

Figure 2:
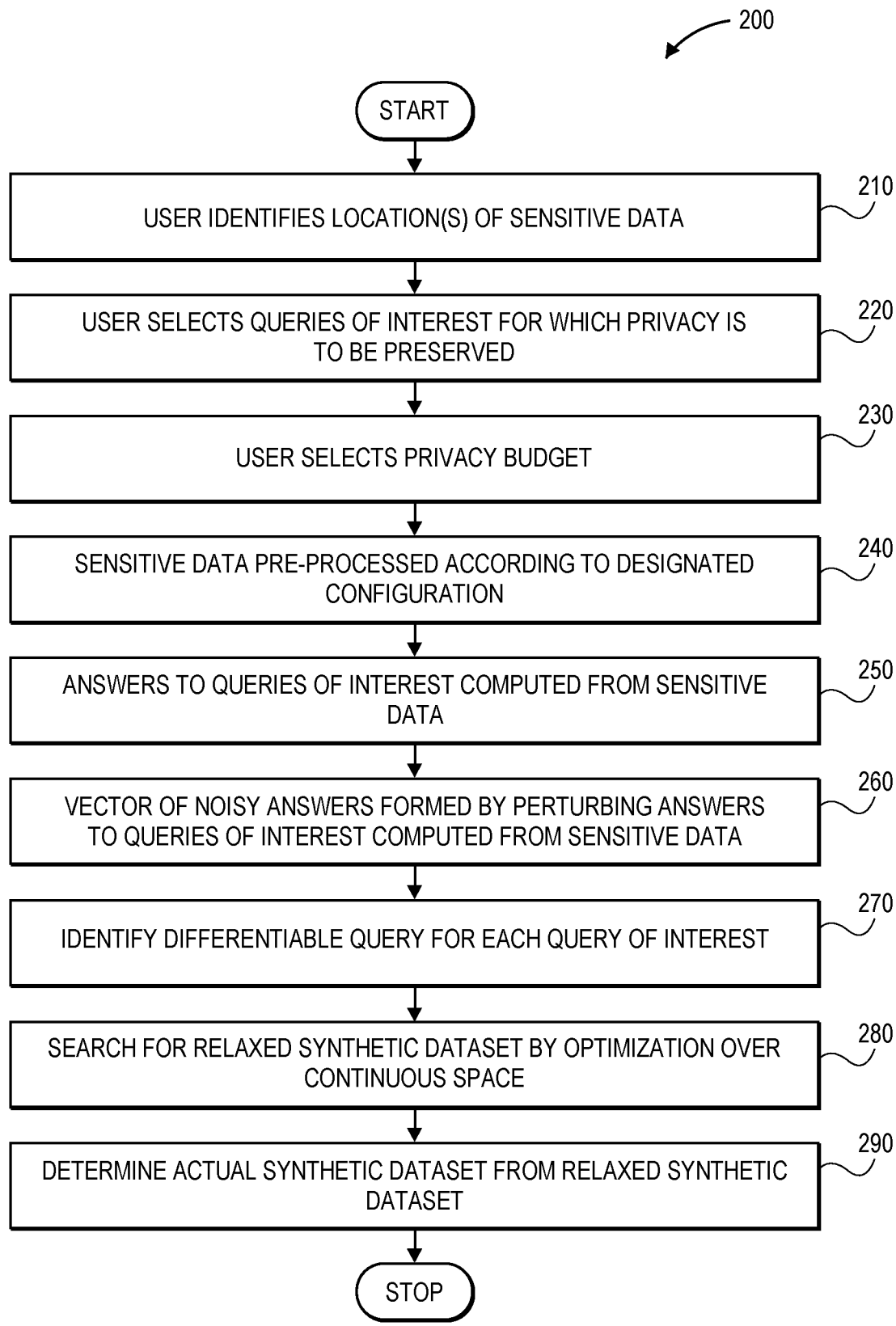
FIG. 2 is a flow chart of one process for synthetic data generation in accordance with embodiments of the present disclosure.

Referring to FIG. 2, a flow chart 200 of one process for synthetic data generation in accordance with embodiments of the present disclosure is shown. At box 210, a user identifies one or more locations of sensitive data. For example, in some implementations, the user may identify one or more locations of files or other sets of data for which synthetic versions are desired. The user may specify or otherwise provide indications of such locations programmatically, e.g., by way of an application programming interface ("API") or a graphical user interface ("GUI"), or in any other manner. Such locations may be in one or more physical computer servers, data stores (e.g., databases) and/or memory components, which may be provided in one or more physical or virtual locations, e.g., in a "cloud"-based environment.

In some implementations, the sensitive data may be represented as a data domain $\chi$ having data points containing d categorical features, or where $\chi = \chi_1 \times \ldots \times \chi_d$, and where each $\chi_i$ is a set of $t_i$ categories. A dataset D may consist of a multiset of n points from $\chi$, or where $D \in \chi^n$. Alternatively, the sensitive data may be represented in any other manner.

At box 220, the user selects one or more queries of interest for which privacy is to be preserved. For example, the user may select one or more queries from a predefined set of queries, or a set of query classes (e.g., linear threshold functions, k-way marginal queries, or others), also programmatically or in any other manner. In some implementations, each of the queries may be statistical queries (e.g., linear queries, or counting queries) defined by a function $q_i: \chi \to [0, 1]$ that are selected by the user.

At box 230, the user selects a privacy budget (or a privacy level). The privacy budget may be selected according to any notion of differential privacy. For example, the user may designate a differential privacy parameter, a privacy loss parameter, a failure probability parameter, or any other aspect by which a privacy budget (or a privacy level) may be defined or established.

At box 240, the sensitive data is pre-processed according to a designated configuration. In some implementations, where one or more variables of the sensitive data are set forth in features that are categorical in nature or form, rather than numerical or binary, the variables may be encoded or otherwise converted into a numerical form, or a binary form. For example, where one variable of a dataset is defined with respect to one or more sets of alphanumeric characters, e.g., gender referenced as "male" or "female," the variables of the dataset may be converted to a numerical form, or a binary form, such as where individuals having a gender "male" are referenced by a number zero, and individuals having a gender "female" are referenced by a number one, or vice versa. Alternatively, where the sensitive data is set forth in categorical features having more than two values, and thus many not be readily converted to a numerical form or a binary form, the categorical features may be embedded into binary features using a one-hot encoding. For example, each categorical feature $\chi_i$ may be replaced with a set of $t_i$ binary features $\chi_i^1 \times \ldots \times \chi_i^{t_i} = \{0, 1\}^{t_i}$ and for each $x \sim \chi^n$. Exactly one of the $t_i$ binary features corresponding to categorical feature $\chi_i$ is set to 1 for any data point x belonging to the domain, and set to zero for all other points belonging to the domain. Thus, where $$d' = \sum_{i=1}^{d}$$

ti is a dimension of a categorical feature vector that has been encoded into binary features by a one-hot encoding, datapoints x are embedded in the binary feature space $\{0,1\}^{d'}$. Alternatively, a configuration for pre-processing the dataset may be determined according to any algorithm, system or technique, e.g., a "best-guess" configuration.

At box 250, answers to the queries of interest are computed based on the sensitive data. For example, in some implementations, where the sensitive data is personal in nature, and relates to properties of a large number of people, one or more statistical queries (or linear or counting queries) may be run on actual values of the sensitive data to identify numbers of the people having a given property. Alternatively, or additionally, one or more marginal queries (or conjunctions) may be run on the sensitive data to identify numbers of the people having combinations of the properties. In some other implementations, any other type or form of queries may be run on the sensitive data.

At box 260, a vector of noisy answers is formed by perturbing the answers to the queries of interest determined at box 250. The answers to the queries of interest may be perturbed in any manner. For example, in some implementations, the answers may be perturbed with noise randomly. In some other implementations, the answers may be perturbed according to a simple Gaussian perturbation technique, a Gaussian mechanism, or in any other manner. In some implementations, a Gaussian mechanism $G(D, q_i, \rho)$ may take as an input a dataset D of size n containing sensitive data, one or more queries of interest and one or more parameters $\rho$ pertaining to the privacy budget selected at box 230, and generate a noisy answer vector a having variables defined by the answers to the queries of interest computed at box 250 and noise in the form of a Gaussian distribution having a variance defined as a function of the parameters pertaining to the privacy budget, or $\hat{a}_i = q_i(D) + Z$, where Z is approximately or equivalent to a Gaussian distribution $N(0, \sigma^2)$ having a mean 0 and variance $\sigma^2 = \frac{1}{2}n^2\rho$. In some other implementations, the answers may be perturbed according to a Laplacian operator, a Poisson process, or in any other manner, or by any other perturbation technique or procedure.

At box 270, differentiable queries are identified for each of the queries of interest. For example, in some implementations, where a query of interest $q_i$ may be evaluated on a vector x of categorical features in an original domain $\chi$, or $x \in \chi$, a differentiable query $\hat{q}_i$, e.g., an equivalent extended query of interest, may be identified for the query of interest $q_i$ as having two properties. First, the differentiable query must be differentiable over a continuous space $X^r$, such that for every value x of the continuous space $X^r$, a gradient $\nabla q_i(x)$ is defined. Second, the differentiable query $\hat{q}_i$ must have an answer that agrees with an answer to the query $q_i$ on every binary value resulting from a one-hot encoding. In some implementations, the differentiable queries may be product queries.

At box 280, a search for a relaxed synthetic dataset is performed by optimization over a continuous space, such that distances (or differences) between answers to the queries of interest computed based on the relaxed synthetic dataset and the vector of noisy answers formed at box 260 are minimized. The relaxed synthetic data lies in a continuous relaxation of a binary feature space defined for the private dataset, and is capable of representing such binary features with non-binary values. For example, one or more differentiable optimization algorithms or techniques such as a gradient descent variant (e.g., a stochastic gradient descent, a batch gradient descent), an ADAM algorithm, or others may be used to identify a dataset that, when the queries of interest are run thereon, matches the noisy answers formed at box 260 to the maximum practicable extent, e.g., in an iterative process. The minimization of distances may occur over a continuous differentiable space. In some implementations, the relaxed synthetic dataset may be optimized in an adaptive manner, such as according to the process represented in the flow chart 400 of FIGS. 4A through 4B and described below.

At box 290, an actual synthetic dataset is determined from the relaxed synthetic dataset, and the process ends. For example, the actual synthetic dataset may be obtained by randomized rounding of the relaxed synthetic dataset identified at box 280. As yet another example, the actual synthetic dataset may be obtained by normalizing the relaxed synthetic dataset identified at box 280, e.g., to values having a range between zero and one, interpreting each of the normalized values as probabilities, and selecting one of the values at random, based on the probabilities. Alternatively, an actual synthetic dataset may be obtained or otherwise derived from a relaxed synthetic dataset in any other manner. In some implementations, however, an actual synthetic dataset need not be determined from the relaxed synthetic dataset determined at box 280.

After a synthetic dataset (e.g., the relaxed synthetic dataset identified at box 280, or the actual synthetic dataset determined at box 290) is derived, the synthetic dataset may be stored in one or more data stores, and utilized for any purpose for which the set of sensitive data may have been utilized, while maintaining the privacy of the sensitive data.

Sets of synthetic data may be derived in an adaptive or iterative manner, e.g., by relaxing an adaptive projection mechanism over a series of iterations (or rounds) to identify a subset of queries for which errors, e.g., differences between answers calculated based on private data (or sensitive data) and answers calculated based on a prior incarnation of the synthetic data, exceed one or more thresholds or are otherwise among the greatest of the errors. The queries for which the errors exceed the one or more thresholds or are among the greatest of the errors may be used to identify a next incarnation of the synthetic data by optimization, e.g., according to a stochastic gradient method, or any other optimization method. Referring to FIGS. 3A through 3E, views of aspects of one system for synthetic data generation in accordance with embodiments of the present disclosure are shown. Except where otherwise noted, reference numerals preceded by the number "3" shown in FIGS. 3A through 3E indicate components or features that are similar to components or features having reference numerals preceded by the number "1" shown in FIGS. 1A through 1G.

Figure 3A:
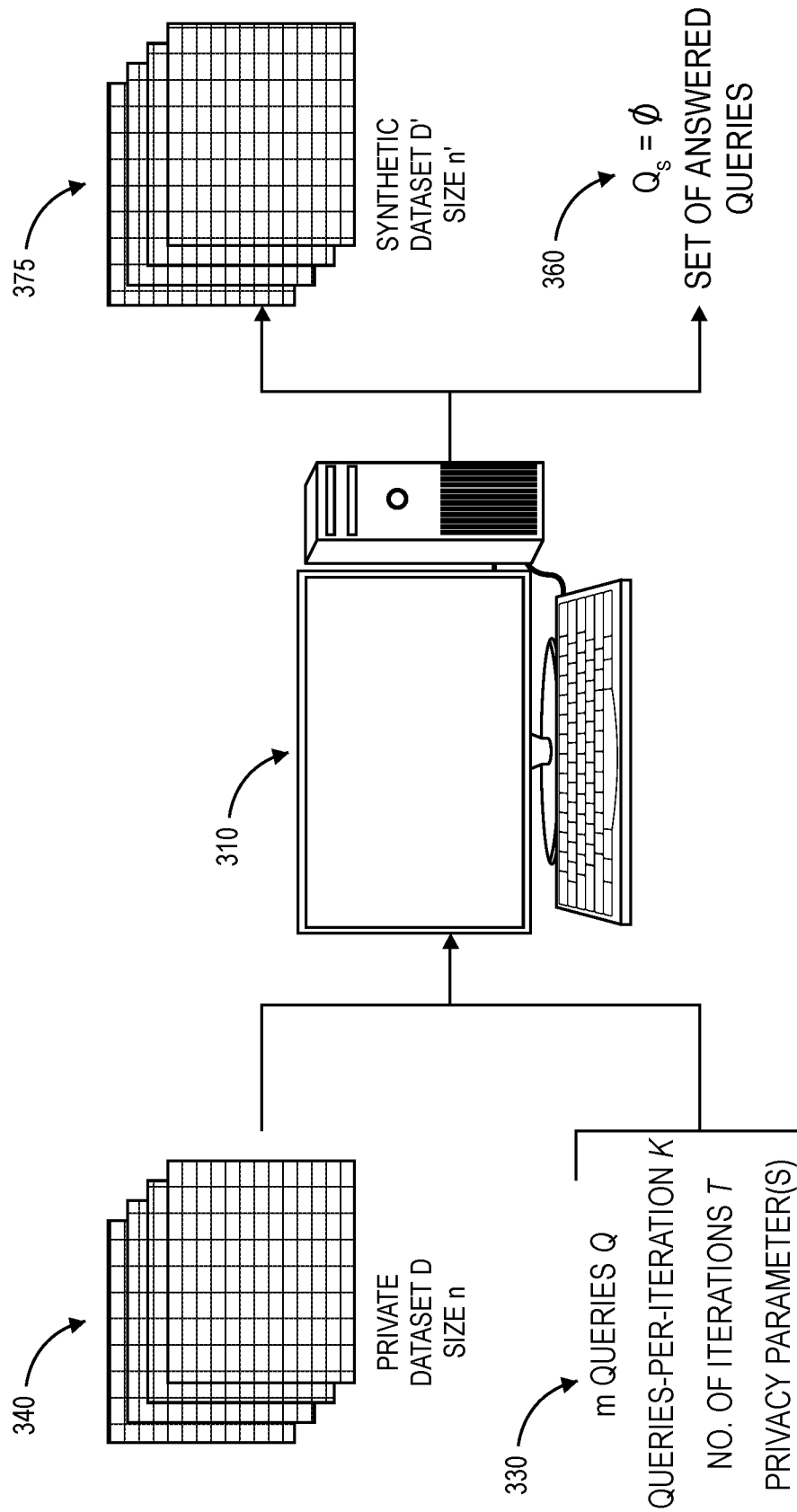
FIGS. 3A through 3E are views of aspects of one system for synthetic data generation in accordance with embodiments of the present disclosure.

As is shown in FIG. 3A, a computer system 310 identifies or obtains information regarding a plurality of selections (or instructions) 330 by one or more users and a private dataset 340, or D, having a size n. The information 330 includes, but need not be limited to, identifiers of a set of m queries Q, a number K of the m queries that are to be identified in each iteration, a number T of iterations, and one or more privacy parameters. In some implementations, the information 330 may be received via one or more selections or interactions with a user interface, such as the user interface 130 shown in FIG. 1B. The private dataset 340 may include data of any type or form, including but not limited to information or data that is customarily or necessarily preserved in confidence according to one or more laws, regulations or public or private policies. The information 330 and the private dataset 340 may be identified or obtained in any manner, such as based on any information or data received from one or more computer devices or systems.

Upon identifying or obtaining the information 330 and the private dataset 340, the computer system 310 may initially designate a set 360 of answered queries Qs as a null set, and initialize a synthetic dataset 375, or D', having a size n', e.g., at random. The size n' of the synthetic dataset 375 may be selected in order to trade off the expressivity of the synthetic dataset 375 with respect to a period of time required in order to complete an optimization, or an amount of processing power, capacity or bandwidth that is required in order to complete the optimization.

The synthetic dataset 375 may be optimized or updated based on answers determined for some of the set of queries Q, e.g., K·T queries, over the T iterations. For example, in each of the iterations, errors may be calculated for each of the set of queries Q based on differences between answers to the set of queries Q calculated based on the private dataset 340, and answers to differentiable equivalents of the set of queries Q calculated based on a prior incarnation of the synthetic dataset 375. Each of the errors may be perturbed with noise according to a simple perturbation, such as a Gaussian perturbation, a Laplacian perturbation, or a Poisson perturbation, or any others.

Figure 3B:
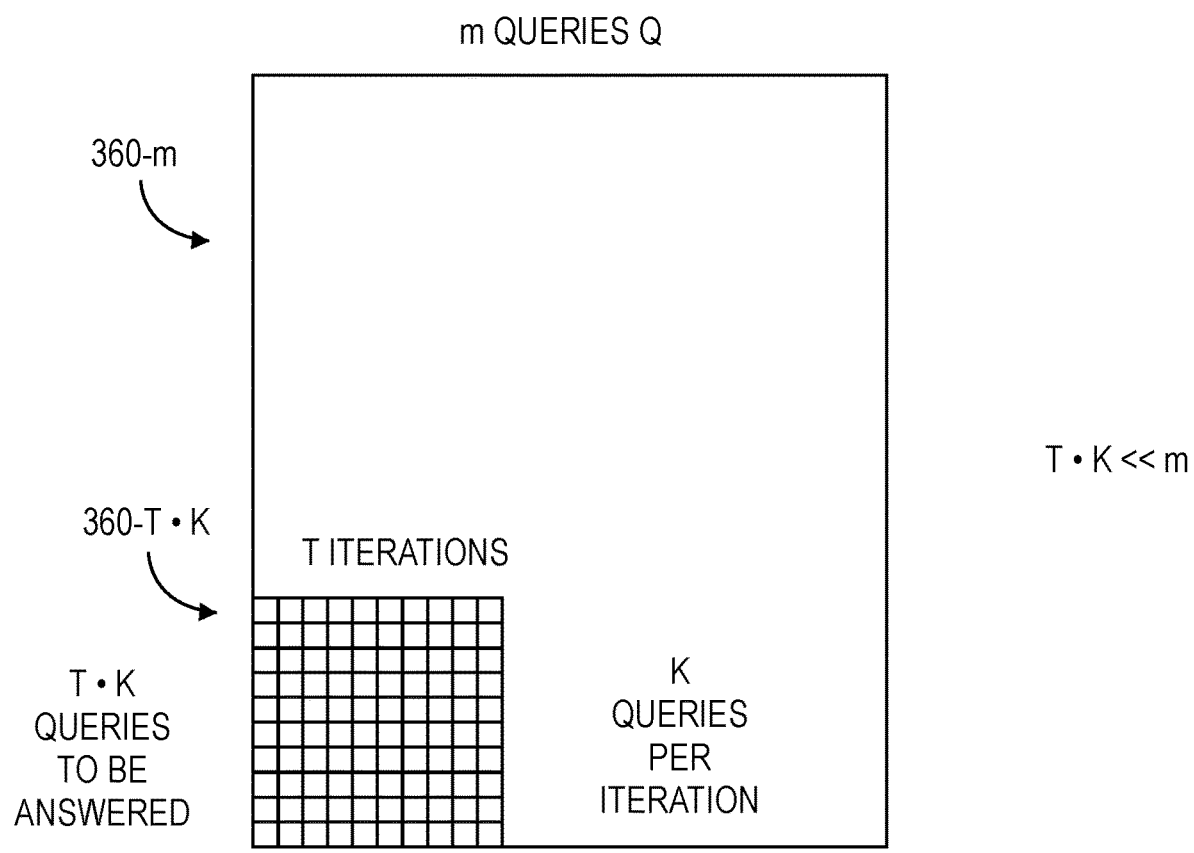

As is shown in FIG. 3B, a subset of the m queries Q, e.g., K queries, may be identified as having the K greatest errors of all of the set of queries Q. The K queries may be answered on the private dataset 340, and added to the set 360 of answered queries Qs. The errors of the K queries may be perturbed by noise, e.g., according to a simple perturbation. In each iteration, the K queries may be the queries of the m queries Q having perturbed errors that exceed a predetermined threshold or otherwise have values that are the K greatest values of the perturbed errors. In some implementations, the K queries may be identified based on outputs of a report noisy max mechanism (or function, algorithm or technique), in order to identify queries with maximum disparities between answers determined for the queries based on the synthetic dataset and the private dataset.

After each of the T iterations, the set Qs of the queries Q will have been answered, and a projection is performed only with respect to the queries of the set Qs, in order to derive an intermediate dataset, e.g., an intermediate relaxed synthetic dataset, or a next incarnation of the relaxed synthetic dataset. Thereafter, in a next iteration, the set Qs is augmented with another K queries that are chosen. The process is repeated until a total of K·T queries, which may be substantially smaller than the total number m of the queries Q, have been answered. Selectively answering fewer than all of the m queries enables a privacy budget to be expended more wisely.

Figure 3C:
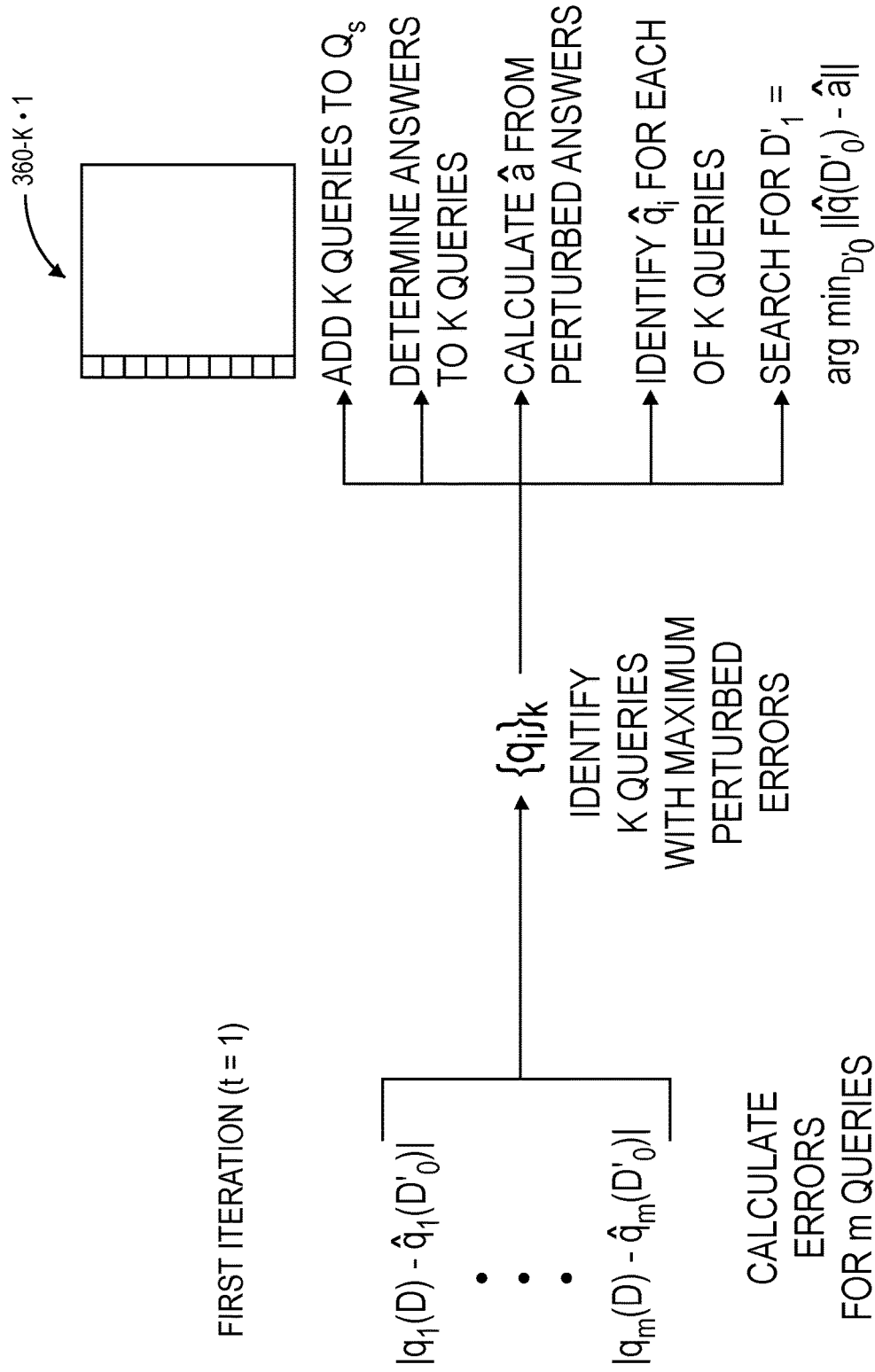

As is shown in FIG. 3C, in a first iteration, such as where a value of a step variable t is equal to one, or t=1, errors are calculated for each of the m queries Q, or based on absolute values of differences between answers to such queries calculated based on the private dataset 340 and answers to differentiable equivalents, or $\hat{q}_i$, of the m queries Q, calculated based on a prior incarnation of the synthetic dataset 375, or $|q_1(D)-\hat{q}_i(D'_0)| \ldots |q_m(D)-\hat{q}_m(D'_0)|$, where t=1. The errors calculated for each of the m queries Q may then be perturbed, or otherwise imparted with noise, e.g., according to a simple perturbation technique. The K queries of the m queries Q having the greatest perturbed errors, or noisy errors, are identified and answered on the private dataset 340. In some implementations, the K queries may be identified according to a report noisy max mechanism (or function, algorithm or technique), or in any other manner.

The K queries are added to the set of answered queries Qs, and noisy answers $\hat{a}_i$ are calculated for each of the K queries based on the answers to the K queries run on the private dataset 340, following a simple perturbation, e.g., a Gaussian perturbation. Additionally, differentiable queries $\hat{q}_i$ are identified for the query $q_i$. Subsequently, a synthetic dataset D'$_t$, or D'$_1$ following the iteration t where t=1, may be generated by optimization, e.g., from arguments of a minimum of differences between answers to the differentiable queries identified for the set of answered queries and the noisy answers generated for the set of answered queries, according to the equation $\arg\min_{D'} \|\hat{q}(D'_0) - \hat{a}\|$.

Figure 3D:
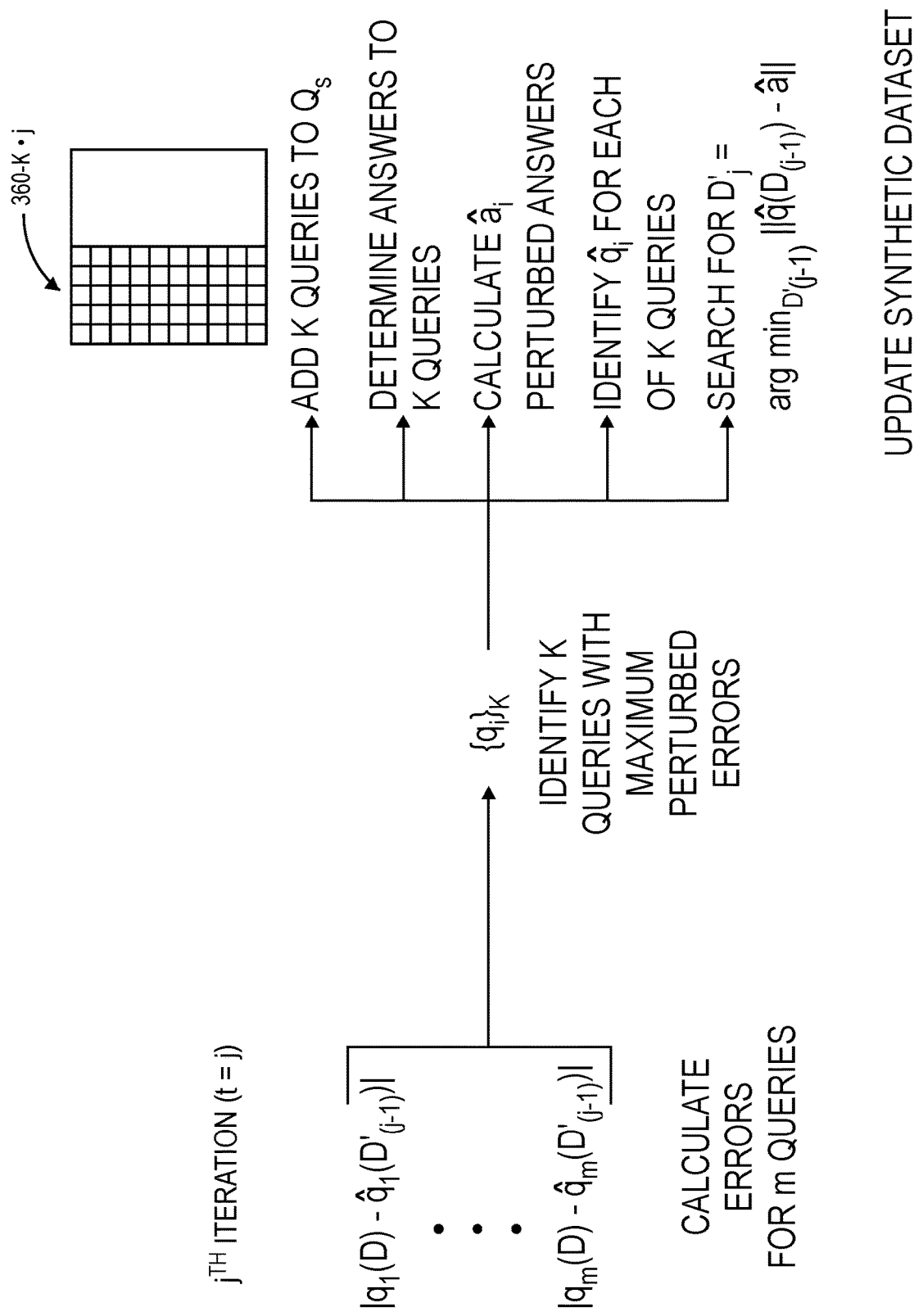

The process by which the synthetic dataset D' is generated or updated may continue for each of the T iterations. As is shown in FIG. 3D, in a j-th iteration, such as where the value of the step variable t is equal to j, or t=j, a set including K queries of the queries Q may be identified based on perturbed errors, or $|q_1(D)-\hat{q}_1(D'_{(j-1)})| \ldots |q_m(D)-\hat{q}_m(D'_{(j-1)})|$, based on the private dataset 340 and the most recent incarnation of the synthetic dataset 375, or D In some implementations, perturbed errors may be calculated for each of the m queries Q during the j-th iteration. In some other implementations, however, perturbed errors may be calculated for only the queries Q not included in the set of queries Qs as of the j-th iteration, or the m−K·(j−1) queries.

The K queries having the greatest perturbed errors calculated during the j-th iteration are identified, e.g., according to a report noisy max mechanism (or function, algorithm or technique), or in any other manner and answered on the private dataset 340. Noisy answers di are calculated for each of the K queries based on the answers to the K queries run on the private dataset 340, following a simple perturbation, e.g., a Gaussian perturbation. Additionally, differentiable queries $\hat{q}_i$ are identified for each of the K queries added to the set of answered queries Qs. Subsequently, a synthetic dataset D'$_t$, or D'$_j$ following the iteration t where t=j, may be generated by optimization, e.g., from arguments of a minimum of differences between answers to the differentiable queries identified for the set of answered queries and the noisy answers generated for the set of answered queries, according to the equation $\arg\min_{D'} \|\hat{q}(D'_{(j-1)}) - \hat{a}\|$.

Figure 3E:
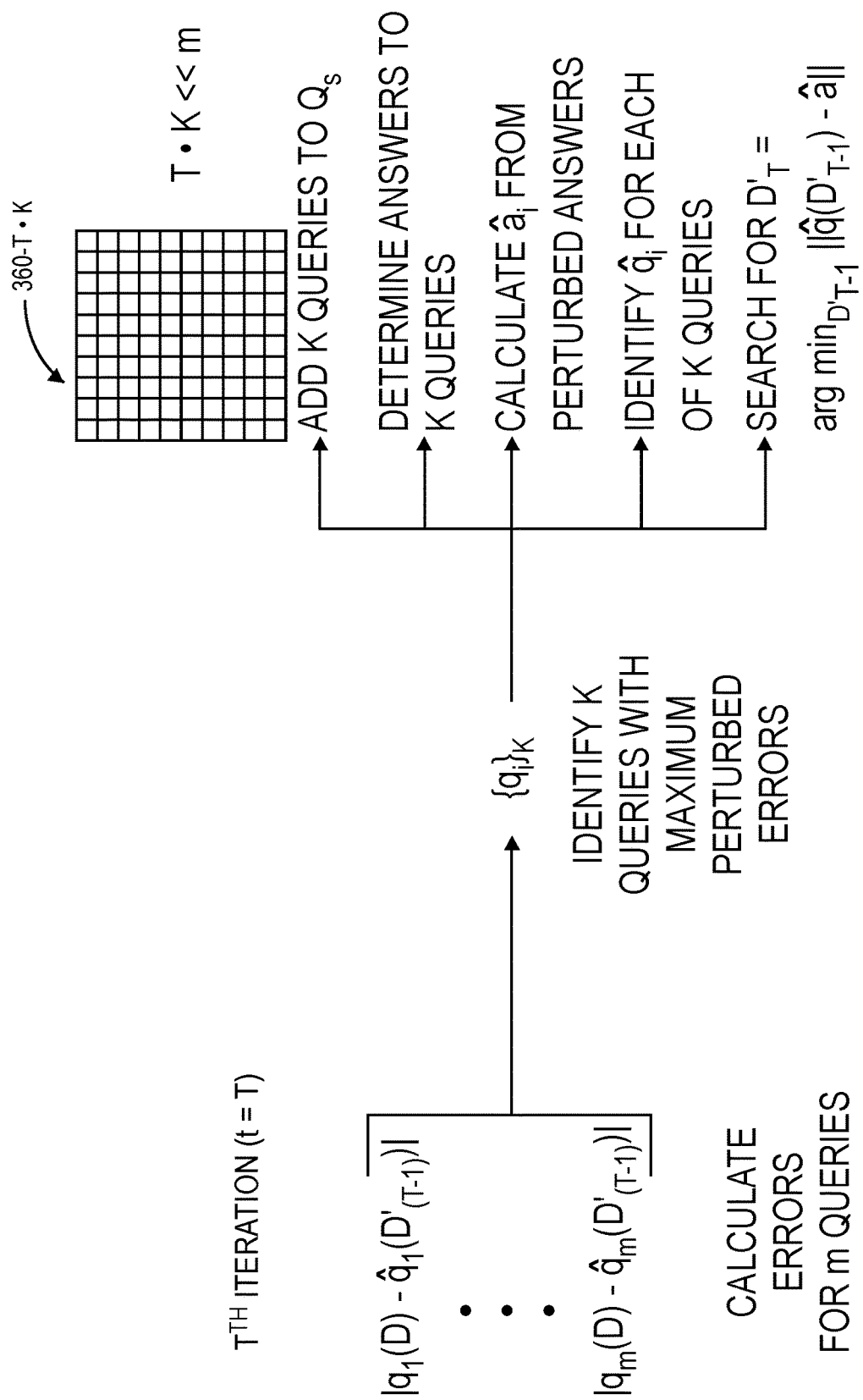
Figure 4A:
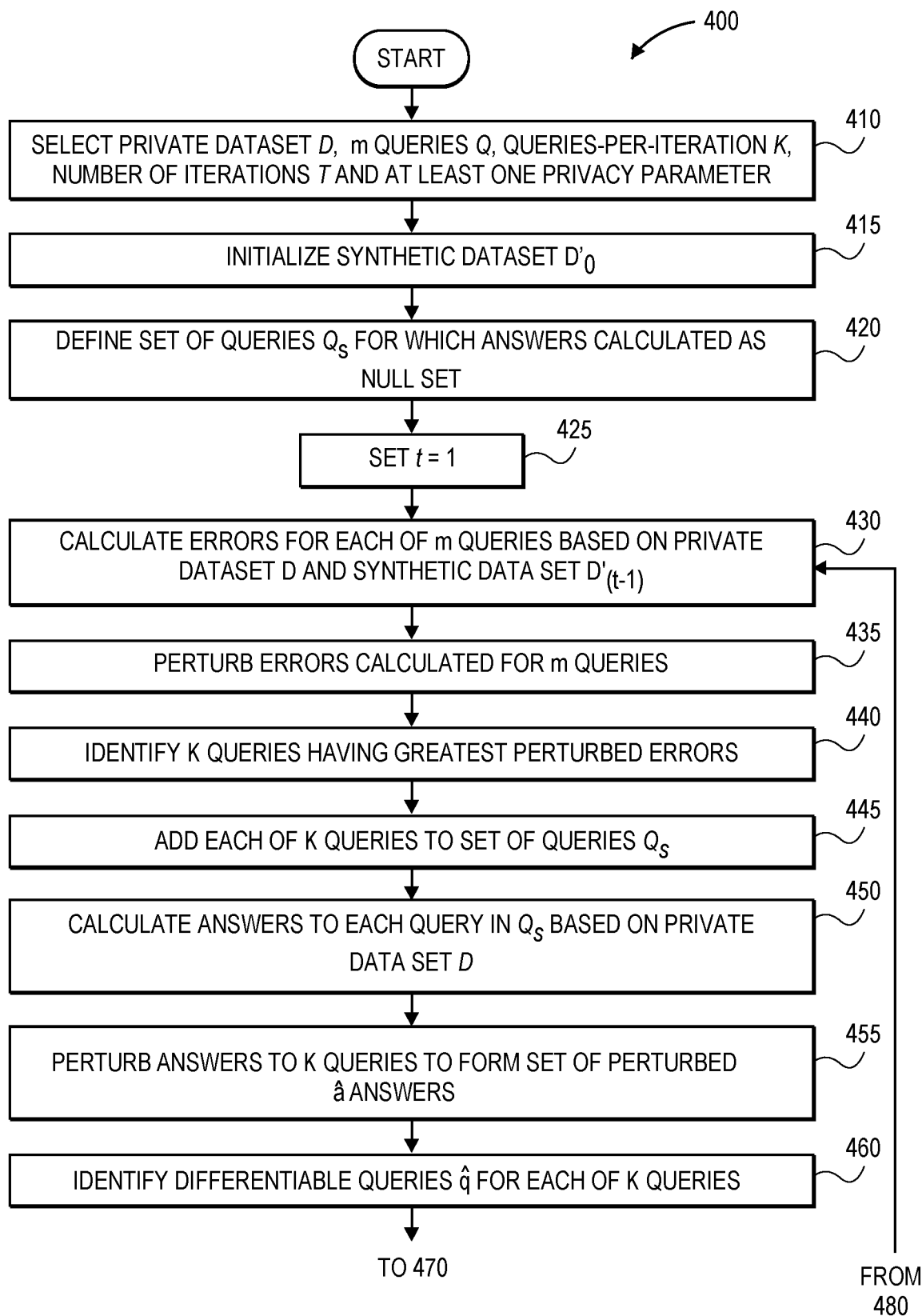
FIGS. 4A and 4B are a flow chart of one process for synthetic data generation in accordance with embodiments of the present disclosure.
Figure 4B:
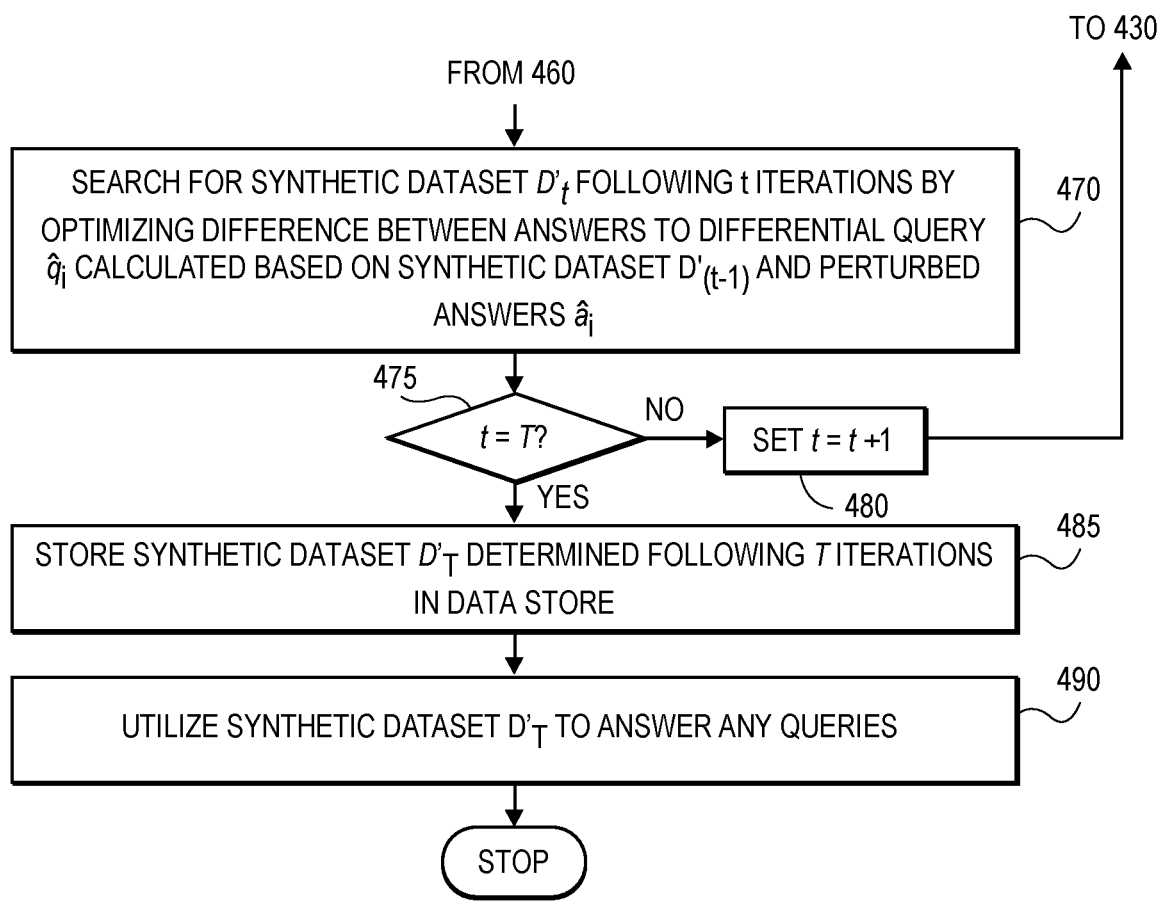

Similarly, as is shown in FIG. 3E, in a T-th (or final) iteration, such as where the value of the step variable t is equal to T, or t=T, a set including K queries of the queries Q may be identified based on perturbed errors, or $|q_1(D)-\hat{q}_1(D'_{(T-1)})| \ldots |q_m(D)-\hat{q}_m(D'_{(T-1)})|$, based on the private dataset 340 and the most recent incarnation of the synthetic dataset 375, or D In some implementations, perturbed errors may be calculated for each of the m queries Q during the T-th iteration. In some other implementations, however, perturbed errors may be calculated for only the queries Q not included in the set of queries Qs as of the T-th iteration, or the m−K·(T−1) queries.

The K queries having the greatest perturbed errors calculated during the T-th iteration are identified, e.g., according to a report noisy max mechanism (or function, algorithm or technique), or in any other manner and answered on the private dataset 340. Noisy answers di are calculated for each of the K queries based on the answers to the K queries run on the private dataset 340, following a simple perturbation, e.g., a Gaussian perturbation. Additionally, differentiable queries $\hat{q}_i$ are identified for each of the K queries added to the set of answered queries Qs. Subsequently, a synthetic dataset D'$_t$, or D'$_T$ following the iteration t where t=T, may be generated by optimization. The synthetic dataset D'$_T$ may then be outputted to one or more data stores or otherwise utilized in any application for which the private dataset D was intended, while maintaining the privacy of the private dataset D.

Referring to FIG. 4, a flow chart 400 of one process for synthetic data generation in accordance with embodiments of the present disclosure is shown. At box 410, a private dataset D, a set of m queries Q, a number of queries K to be considered in each iteration, a total number of iterations T and at least one privacy parameter are selected. The private dataset D may contain any type or form of data, e.g., sensitive data, which may be subject to any legal or regulatory requirements or obligations of confidentiality or privacy preservation. In some implementations, the private dataset D may be pre-processed, e.g., according to a designated configuration, such as where one or more variables of the private dataset D are categorical in nature or form, rather than binary or numerical, such variables may be encoded or otherwise converted into a binary form or a numerical form. Alternatively, the private dataset D may be pre-processed according to any algorithm, system or technique, and in any manner.

In some implementations, the at least one privacy parameter may include a privacy loss parameter, a failure probability parameter, or a concentrated differential privacy parameter, or any other privacy parameter. For example, in some implementations, the user may designate a first privacy parameter (e.g., a privacy loss parameter) $\epsilon$, and a second privacy parameter (e.g., a failure probability parameter) $\delta$. Based on the first privacy parameter $\epsilon$ and the second privacy parameter $\delta$, a third privacy parameter $\rho$ (e.g., a zero-concentrated differential privacy parameter, or "zCDP") may be calculated according to the equation $\epsilon = \rho + 2\sqrt{(\rho \log(1/\delta))}$.

At box 415, a synthetic dataset D'$_0$ is initialized. In some implementations, the synthetic dataset D'$_0$ may be a relaxed synthetic dataset, and an initial value or set of values of the synthetic dataset D'$_0$ may be selected at random, or in any other manner. At box 420, a set of queries Qs of the queries Q for which answers have been calculated on the private dataset D is defined as null, or Qs=0.

At box 425, a value of a first step variable t corresponding to a number of iterations of the total number of iterations T is set equal to one, or t=1. At box 430, errors are calculated for each of the m queries based on the private dataset D and the synthetic dataset D'$_{(t-1)}$, e.g., a most recent incarnation of the synthetic dataset.

At box 435, each of the errors calculated for the m queries is perturbed, e.g., according to a simple perturbation, and at box 440, K queries of the queries Q having the greatest perturbed errors are identified. In some implementations, the K queries may be identified according to a report noisy max mechanism (or function, algorithm or technique), which may take as inputs the private dataset D, a vector of the m queries Q, a vector of answers a to the queries Q calculated based on the most recent incarnation of the synthetic dataset D'$_{(t-1)}$, and one or more privacy parameters. For example, the one or more privacy parameters may include a concentrated differential privacy parameter, such as the third privacy parameter ρ, divided by a product of 2 multiplied by the total number of iterations T and the number K of queries to be considered in each iteration, or ρ/2T·K. For example, where the value of the first step variable t is equal to one, or t=1, the synthetic dataset $D'_{(t-1)}$ is the synthetic dataset initialized at box 415, or $D'_0$. The report noisy max mechanism may output an index of a query having a highest noisy error estimate, such as $i^* = \arg\max_{i \in [m]} (|q_i(D) - a_i| + Z_i)$, where $Z_i$ is a Laplace transform of $(2/n\sqrt{(2\rho)})$, and may be run any number of times, e.g., K times, on the queries Q. Alternatively, K queries having the greatest error may be identified in any other manner, or by any other mechanism.

At box 445, each of the K queries having the greatest errors are added to the set of queries Qs, and at box 450, answers to each of the K queries are calculated based on the private dataset D. For example, one or more of the K queries may be statistical queries (e.g., linear queries or counting queries), and the answer to the queries may be numbers of people or other entities represented in the private dataset D having a specific property. Alternatively, or additionally, one or more of the K queries may be marginal queries, and the answers to the queries may be numbers of the people or the other entities represented in the private dataset D having a given combination of properties.

For example, in some implementations, where the sensitive data is personal in nature, and relates to properties of a large number of people, one or more statistical queries (or linear or counting queries) may be run on the sensitive data to identify numbers of the people having a given property. Alternatively, or additionally, one or more marginal queries (or conjunctions) may be run on the sensitive data to identify numbers of the people having combinations of the properties. In some other implementations, any other type or form of queries may be run on the sensitive data.

At box 455, the answers to each of the K queries calculated based on the private dataset D at box 450 are perturbed, e.g., by a simple perturbation, or any other perturbation, and a set of perturbed answers a to each of the K queries are formed. The set of perturbed answers $â_i$ may be calculated by a Gaussian perturbation of the answers, or by any other perturbation technique.

At box 460, differentiable queries $\hat{q}_i$ are identified for each of the K queries. In some implementations, the differentiable queries $\hat{q}_i$ may be equivalent extended differentiable queries that are differentiable over a continuous space X such that for every value x of the continuous space $X_r$, a $\nabla q_i(x)$ is defined, and that the differentiable queries $\hat{q}_i$ have answers that agree with answers to the queries $q_i$ on every value resulting from a one-hot encoding.

At box 470, a search for a next incarnation of the synthetic dataset $D'_t$ is performed by optimizing differences between answers to the differentiable queries $\hat{q}_i$ identified at box 460 calculated based on the synthetic dataset $D'_{(t-1)}$ and the noisy answers $â_i$ calculated for each of the set of queries Qs. For example, one or more differentiable optimization algorithms or techniques such as a gradient descent variant (e.g., a stochastic gradient descent, a batch gradient descent), an ADAM algorithm, or others may be used to identify a synthetic dataset $D'_t$ that, when the queries of interest are run thereon, matches the noisy answers formed at box 455 to the maximum practicable extent, e.g., in an iterative process. Where the synthetic dataset $D'_t$ is a relaxed synthetic dataset, the synthetic dataset $D'_t$ may allow for fractional values, rather than binary values, enabling the use of gradient techniques to optimize the differences between the answers to differentiable queries $\hat{q}_i$ and noisy answers $â_i$.

At box 475, whether the value of the first step variable t is equal to the total number iterations T, or t=T, is determined. If the value of the first step variable t is not equal to T, then the process advances to box 480, where the value of the first step variable t is incremented by one, or set equal to t+1, before returning to box 430, where errors are calculated for each of the m queries based on the private dataset D and the synthetic dataset $D'_{(t-1)}$, e.g., a most recent incarnation of the synthetic dataset, and to box 435, where the errors are perturbed. Alternatively, in some implementations, perturbed errors may be calculated for only the queries Q not included in the set of queries Qs as of the t-th iteration, or the m−K·(t−1) queries.

If the value of the first step variable t is equal to T, however, then the process advances to box 485, where the synthetic dataset $D'_T$ is stored in one or more data stores following the T interactions. Alternatively, an actual synthetic dataset may be obtained based on the synthetic dataset $D'_T$, such as by randomized rounding, by normalization, or in any other manner. At box 490, the synthetic dataset $D'_T$ is utilized to answer queries of any type or form, thereby preserving the privacy in the private dataset D, and the process ends.

The types or forms of private data that may be processed in accordance with implementations of the present disclosure and used to generate sensitive data are not limited by any of the embodiments disclosed or referenced herein. For example, the private data may include any type or form of sensitive data, or any other data that is to be restricted or maintained in confidence for any reason. In some implementations, such as where one or more of the systems or methods disclosed herein are operated or utilized by an electronic marketplace or another commercial enterprise in communication with one or more computer devices or systems owned or operated by customers, the private data may include identities of the customers, as well as street addresses, identifiers of payment instruments (e.g., credit cards or bank cards), or purchase histories of the customers. Where one or more of the systems or methods disclosed herein are operated or utilized by a medical enterprise (e.g., a hospital, a health care provider, or a health insurer), in communication with computer devices or systems associated with one or more doctors, health care providers or other resources, the private data may include identities of patients, as well as street addresses, identifiers of insurance policies, or identifiers of medical conditions or histories (e.g., treatment plans, procedures or prescriptions) of one or more of the patients. Where one or more of the systems or methods disclosed herein are operated or utilized by a government agency, in communication with computer devices or systems operated by agents of the government agency or private citizens, the private data may include strategic plans or information of the government agency, or other personal information of citizens (e.g., tax identification numbers such as Social Security Numbers). Alternatively, private data that is utilized, processed or otherwise relied upon in accordance with implementations of the present disclosure may be data that is obtained from any source, and is customarily or necessarily preserved in confidence according to one or more laws, regulations or public or private policies.

Figure 5:
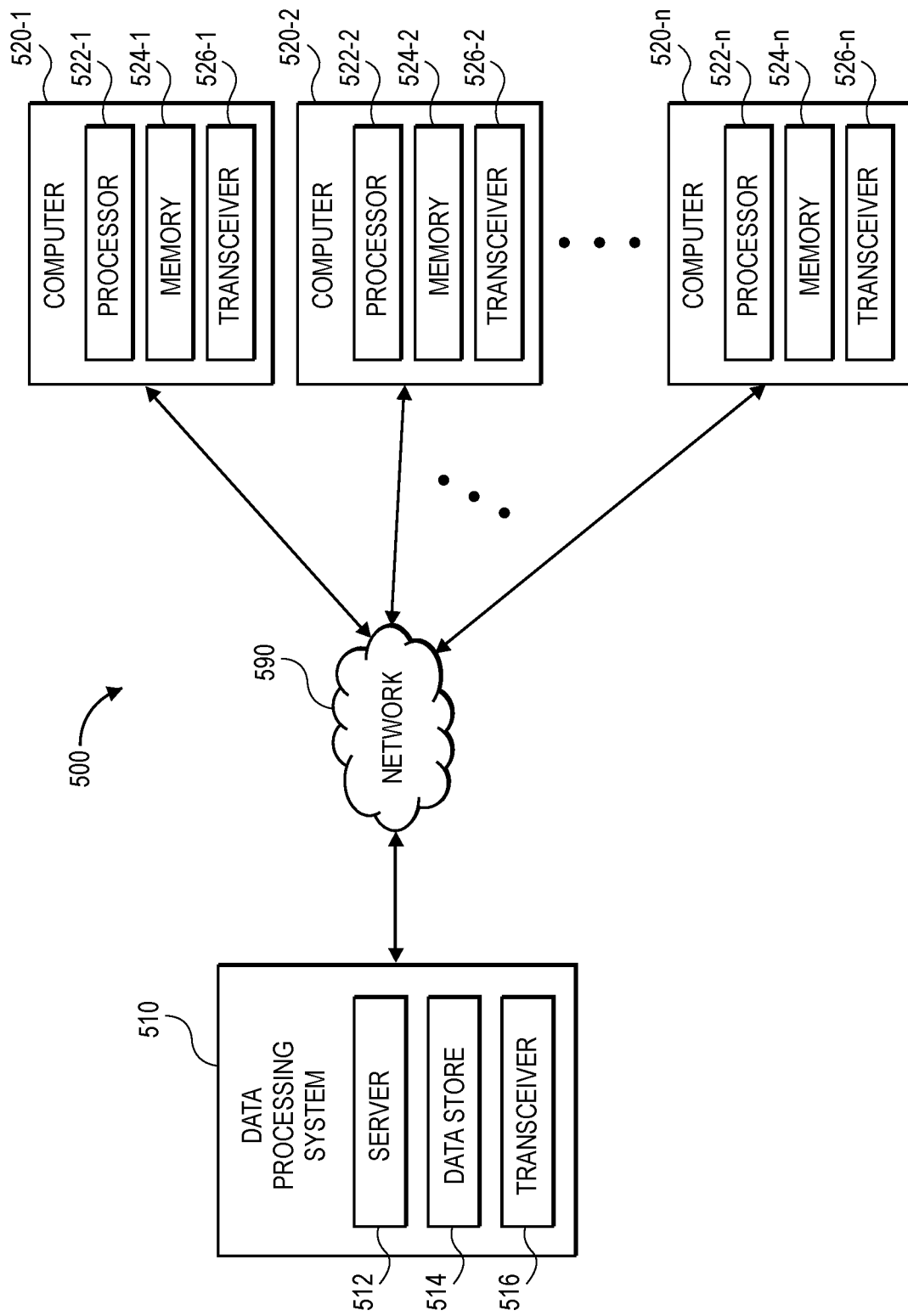
FIG. 5 is a block diagram of one system for synthetic data generation in accordance with embodiments of the present disclosure.

Referring to FIG. 5, a block diagram of components of one system 500 for synthetic data generation in accordance with embodiments of the present disclosure is shown. The system 500 of FIG. 5 includes a data processing system 510 and a plurality of computers 520-1, 520-2 ... 520-n that are connected to one another over a network 590. Except where otherwise noted, reference numerals preceded by the number "5" shown in the block diagram of FIG. 5 indicate components or features that are similar to components or features having reference numerals preceded by the number "3" shown in FIGS. 3A through 3E or by the number "1" shown in FIGS. 1A through 1G.

The data processing system 510 includes a networked computer infrastructure for performing various computer-related functions associated with the receipt, storage, processing and distribution of such items, including one or more physical computer servers 512, data stores (e.g., databases) 514 and/or transceivers 516, that may be provided in one or more physical or virtual locations, e.g., in a "cloud"-based environment. In some implementations, the servers 512, the data stores 514 and/or the transceivers 516 or any number of other computing devices or resources may further execute any type of computer-based function or compute any type or form of calculation on public data (e.g., public datasets, or data that is accessible to any users of one or more of the computers 520-1, 520-2 . . . 520-$n$) or private data (e.g., private datasets, or data that is accessible or restricted to one or more owners of the data), including but not limited to any formulas, equations, algorithms or techniques for determining one or more probabilities or performing any number of statistical tests. In some implementations, the servers 512, the data stores 514 and/or the transceivers 516 may be configured to execute one or more machine learning models, systems or techniques.

In some implementations, the server 512 (or any other computer devices or systems associated with the data processing system 510) may be configured to execute any number of calculations or functions associated with training or utilizing one or more machine learning systems or techniques. For example, in some implementations, the server 512 may train an artificial neural network or other machine learning model in a supervised or unsupervised manner. In some implementations, the machine learning model may include any number of neurons in any number of layers, including an input layer, an output layer, and one or more intervening hidden layers. Each of the neurons in a layer within a neural network may receive an input and generate an output in accordance with an activation or energy function, with parameters corresponding to the various strengths or synaptic weights, e.g., in the form of a sigmoid function, wherein an output thereof may have a range of zero to one or 0 to 1, a hyperbolic tangent function, wherein an output thereof may have a range of negative one to positive one, or −1 to +1, or any others. A machine learning system operated by the data processing system 510, such as an artificial neural network, a factorization method or analysis, a generative model, a gradient boosted decision tree, a K-means clustering analysis, a nearest neighbor method or analysis, a Random Forest algorithm, a similarity measure, or a support vector machine, may be further trained using any information, data or metadata. Once a machine learning system is trained, the data processing system 510 may utilize the machine learning system to perform any task or function.

The transceiver 516 may be configured to enable the data processing system 510 to communicate through one or more wired or wireless means, e.g., wired technologies such as Universal Serial Bus (or "USB") or fiber optic cable, or standard wireless protocols such as Bluetooth® or any Wi-Fi protocol, such as over the network 590 or directly. The transceiver 516 may further include or be in communication with one or more input/output (or "I/O") interfaces, network interfaces and/or I/O devices, and may be configured to allow information or data to be exchanged between one or more of the components of the data processing system 510, or to one or more other computer devices or systems (not shown) via the network 590. For example, in some implementations, the transceiver 516 may be configured to coordinate I/O traffic between the server 512 or the data store 514 and any of the computers 520-1, 520-2 . . . 520-$n$, or any other computer devices or systems (not shown). The transceiver 516 may perform any necessary protocol, timing or other data transformations in order to convert data signals from a first format suitable for use by one component into a second format suitable for use by another component. In some implementations, the transceiver 516 may include support for devices attached through various types of peripheral buses, e.g., variants of the Peripheral Component Interconnect (PCI) bus standard or the USB standard. In some other implementations, functions of the transceiver 516 may be split into two or more separate components, or integrated with the server 512.

The computers 520-1, 520-2 . . . 520-$n$ may be any computer devices or systems such as tablet computers, laptop computers, desktop computers, mobile devices (e.g., smartphones), wristwatches, smart speakers, or other devices or systems. As is shown in FIG. 5, each of the computers 520-1, 520-2 . . . 520-$n$ has one or more processors 522-1, 522-2 . . . 522-$n$, one or more memory components 524-1, 524-2 . . . 524-$n$, and one or more transceivers 526-1, 526-2 . . . 526-$n$. In some implementations, the computers 520-1, 520-2 . . . 520-$n$ may be configured to receive one or more interactions from users, by way of one or more I/O devices (not shown).

The processors 522-1, 522-2 . . . 522-$n$ may be configured to perform any type or form of computing function associated with operations of the data processing system 510, including but not limited to computer-based functions or calculations on public data or private, including but not limited to any formulas, equations, algorithms or techniques for determining one or more probabilities or performing any number of statistical tests, or the execution of one or more machine learning tools, algorithms or techniques. The processors 522-1, 522-2 . . . 522-$n$ may also be configured to execute any other algorithms or techniques (e.g., object detection or recognition algorithms or techniques) associated with one or more applications, purposes or functions. For example, the processors 522-1, 522-2 . . . 522-$n$ may be configured to control any aspects of the operation of the data processing system 510.

The processors 522-1, 522-2 . . . 522-$n$ may be uniprocessor systems including one processor, or multiprocessor systems including several processors (e.g., two, four, eight, or another suitable number), and may be capable of executing instructions. For example, in some embodiments, the processors 522-1, 522-2 . . . 522-$n$ may be general-purpose or embedded processor units such as a CPU or a GPU having any number of instruction set architectures (ISAs), such as the x86, PowerPC, SPARC, or MIPS ISAs, or any other suitable ISA. Where the processors 522-1, 522-2 . . . 522-$n$ are multiprocessor systems, each of the processors within the multiprocessor system may operate the same ISA, or different ISAs.

Additionally, the computers 520-1, 520-2 . . . 520-$n$ further include one or more memory or storage components 524-1, 524-2 . . . 524-$n$ (such as databases or data stores) for storing any type of information or data, e.g., instructions for operating the computers 520-1, 520-2 . . . 520-$n$, or information or data generated, captured or received during operations of the computers 520-1, 520-2 . . . 520-$n$. The memory 524-1, 524-2 . . . 524-*n* may be implemented using any suitable memory technology, such as random-access memory (or "RAM"), static RAM (or "SRAM"), synchronous dynamic RAM (or "SDRAM"), non-volatile/Flash-type memory, or any other type of memory. In some embodiments, public data, private data and/or other data items may be received or sent via the transceivers 526-1, 526-2 . . . **526-*n***, e.g., by transmission media or signals, such as electrical, electromagnetic, or digital signals, which may be conveyed via a communication medium such as a wired and/or a wireless link.

The transceivers 526-1, 526-2 . . . **526-*n* may share any number of attributes or features in common with the transceivers 516 of the data processing system 510**, or may have any number of other attributes or features.

In some implementations, one or more of the computers 520-1, 520-2 . . . **520-*n*** may further include one or more sensors (not shown) for capturing information or data of any type or form. Such sensors may include, but need not be limited to, one or more cameras configured to capture visual imaging data, depth imaging data or any other type or form of imaging data, as well as acoustic sensors (e.g., microphones, piezoelectric sensors, vibration sensors or other transducers for detecting and recording acoustic energy from one or more directions), speedometers, inclinometers, thermometers, barometers, hygrometers, air monitoring sensors (e.g., oxygen, ozone, hydrogen, carbon monoxide or carbon dioxide sensors), ozone monitors, pH sensors, moisture sensors, magnetic anomaly detectors, metal detectors, radiation sensors (e.g., Geiger counters, neutron detectors, alpha detectors), ranging sensors (e.g., radar, sonar or LIDAR ranging sensors) or others.

Although the system 500 shown in the block diagram of FIG. 5 includes a single box for a data processing system 510 having single boxes for a server 512, a data store 514 and a transceiver 516, those of ordinary skill in the pertinent arts will recognize that the systems and methods disclosed herein may utilize any number of systems having any number of servers, data stores or transceivers in accordance with the present disclosure. Likewise, although the system 500 shown in the block diagram of FIG. 5 includes three boxes for computers 520-1, 520-2 . . . **520-*n*, each having single boxes for processors 522-1, 522-2 . . . 522-*n*, memory components 524-1, 524-2 . . . 524-*n* or transceivers 526-1, 526-2 . . . 526-*n***, those of ordinary skill in the pertinent arts will recognize that the systems and methods disclosed herein may utilize any number of computers having any number of processors, memory components or transceivers in accordance with the present disclosure.

The network 590 may be any wired network, wireless network, or combination thereof, and may comprise the Internet in whole or in part. In addition, the network 590 may be a personal area network, local area network, wide area network, cable network, satellite network, cellular telephone network, or combination thereof. The network 590 may also be a publicly accessible network of linked networks, possibly operated by various distinct parties, such as the Internet. In some embodiments, the network 590 may be a private or semi-private network, such as a corporate or university intranet. The network 590 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data processing system 510, the computers 520-1, 520-2 . . . **520-*n* or any other computer devices or systems of the system 500 (not shown) may use any web-enabled or Internet applications or features, or any other client-server applications or features, to connect to the network 590, or to communicate with one another. For example, the data processing system 510 and/or the computers 520-1, 520-2 . . . 520-*n* may be adapted to transmit information or data in the form of synchronous or asynchronous messages in real time or in near-real time, or in one or more offline processes, via the network 590. Those of ordinary skill in the pertinent art would recognize that the data processing system 510 or the computers 520-1, 520-2 . . . 520-*n* may operate, include or be associated with any of a number of computing devices that are capable of communicating over the network 590**. The protocols and components for providing communication between such devices are well known to those skilled in the art of computer communications and need not be described in more detail herein.

In some implementations, the data processing system 510 or the computers 520-1, 520-2 . . . **520-*n*** may execute any type or form of algorithm for auto-differentiation or optimization, e.g., an auto-differentiation framework, such as JAX, Python, PyTorch, MXNet, TensorFlow, or others. Moreover, one or more of the algorithms, formulas or techniques described herein may be executed on any type or form of computing device or system.

The data and/or computer executable instructions, programs, firmware, software and the like (also referred to herein as "computer executable" components) described herein may be stored on a computer-readable medium that is within or accessible by computers or computer components such as the server 512, the data store 514, the transceiver 516, or any of the computers 520-1, 520-2 . . . **520-*n*, or any other computer devices or systems of the system 500** (not shown), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 2 or 4A and 4B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   receiving, from a user associated with a private dataset,
      an identifier of at least one of the private dataset or a location of the private dataset;
      a privacy budget;
      a first number of queries per iteration; and
      a second number of iterations;
   identifying a plurality of queries, wherein each of the plurality of queries is within a common class of queries, and wherein a third number of the plurality of queries is greater than a product of the first number and the second number;
   initializing a first synthetic dataset;
   in a first iteration,
      calculating a first set of errors for each of the plurality of queries based at least in part on the private dataset and the first synthetic dataset, wherein each of the first set of errors is an absolute value of a difference between an answer to one of the plurality of queries determined using the private dataset and an answer to a differentiable query corresponding to the one of the plurality of queries determined using the first synthetic dataset;
      perturbing each of the first set of errors according to a simple perturbation;
      selecting a first set of queries based at least in part on the first set of errors perturbed according to the simple perturbation, wherein a number of the first set of queries is the first number, and wherein each of the first set of queries has one of the first number of greatest errors of the first set of errors;
      calculating answers to each of the first set of queries using the private dataset;
      perturbing the answers to each of the first set of queries according to a simple perturbation; and adding each of the first set of queries to a set of selected queries; and following at least the first iteration;
- identifying differentiable queries corresponding to the set of selected queries, wherein each of the differentiable queries is differentiable over a domain including at least the first synthetic dataset;
- determining answers to each of the differentiable queries corresponding to the set of selected queries using the first synthetic dataset; and
- determining a second synthetic dataset according to a gradient optimization method, wherein the second synthetic dataset is determined based at least in part on the answers to each of the differentiable queries corresponding to the set of selected queries perturbed according to the simple perturbation and answers to each of the set of selected queries determined using the first synthetic dataset.

2. The method of claim 1, further comprising:

in a second iteration,
- calculating a second set of errors for a subset of the plurality of queries based at least in part on the private dataset and the second synthetic dataset, wherein the subset of the plurality of queries does not include the first set of queries, wherein each of the second set of errors is an absolute value of a difference between an answer to one of the subset of the plurality of queries determined using the private dataset and an answer to a differentiable query corresponding to the one of the subset of the plurality of queries determined using the second synthetic dataset;
- perturbing each of the second set of errors according to a simple perturbation;
- selecting a second set of queries based at least in part on the second set of errors perturbed according to the simple perturbation, wherein a number of the second set of queries is the first number, and wherein each of the second set of queries has one of the first number of greatest errors of the second set of errors;
- calculating answers to each of the second set of queries using the private dataset;
- perturbing the answers to each of the second set of queries according to a simple perturbation; and
- adding each of the second set of queries to the set of selected queries; and following at least the second iteration;
- identifying differentiable queries corresponding to the set of selected queries, wherein each of the differentiable queries is differentiable over a domain including at least the second synthetic dataset;
- determining answers to each of the differentiable queries corresponding to the set of selected queries using the second synthetic dataset; and
- determining a third synthetic dataset according to a gradient optimization method, wherein the third synthetic dataset is determined based at least in part on the answers to each of the differentiable queries corresponding to the set of selected queries perturbed according to the simple perturbation and answers to each of the set of selected queries determined using the second synthetic dataset.

3. The method of claim 1, wherein the gradient optimization method is a stochastic gradient method that identifies the second synthetic dataset from arguments of a minimum of differences between the answers to each of the set of selected queries determined according to the first synthetic dataset and the answers to each of the differentiable queries corresponding to the set of selected queries calculated according to the private dataset and perturbed according to the simple perturbation.

4. The method of claim 1, wherein the private dataset is one of a text file, a Comma-Separated Value file, a Protocol Buffer file or a JavaScript Object Notation file comprising:
- data regarding a plurality of customers of an electronic marketplace, wherein the data comprises:
- identifiers of each of the plurality of customers and at least one of:
  - identifiers of payment instruments, wherein each of the payment instruments is associated with one of the plurality of customers;
  - identifiers of street addresses, wherein each of the street addresses is associated with one of the plurality of customers; or
  - identifiers of items, wherein each of the items was previously purchased from the electronic marketplace by at least one of the plurality of customers.

5. A method comprising:
- identifying a set of private data;
- identifying a plurality of queries;
- generating a first synthetic dataset;
- calculating a first set of errors for each of the plurality of queries, wherein each of the errors is an absolute value of a difference between an answer to one of the plurality of queries determined using the set of private data and an answer to a differentiable query corresponding to the one of the plurality of queries determined using the first synthetic dataset;
- perturbing each of the errors of the first set according to at least one simple perturbation;
- selecting a first set of queries based at least in part on the errors of the first set perturbed according to the simple perturbation, wherein the errors of the first set calculated for each of the first set of queries and perturbed according to the simple perturbation have the greatest values of the errors of the first set;
- calculating answers to each of the first set of queries using the set of private data;
- perturbing the answers to each of the first set of queries according to at least one simple perturbation;
- adding each of the first set of queries to a set of selected queries;
- identifying differentiable queries corresponding to the set of selected queries, wherein each of the differentiable queries is differentiable over a domain including at least the first synthetic dataset;
- determining answers to each of the differentiable queries corresponding to the set of selected queries using the first synthetic dataset; and
- determining a second synthetic dataset according to an optimization technique, wherein the second synthetic dataset is determined based at least in part on the answers to each of the differentiable queries corresponding to the set of selected queries perturbed according to the simple perturbation and answers to each of the set of selected queries determined using the first synthetic dataset.

6. The method of claim 5, further comprising:
- calculating a second set of errors for each of a subset of the plurality of queries, wherein the subset of the plurality of queries does not include the first set of queries, wherein each of the errors is an absolute value of a difference between an answer to one of the subset of the plurality of queries determined using the private dataset and an answer to a differentiable query corresponding to the one of the subset of the plurality of queries determined using the second synthetic dataset;

perturbing each of the errors of the second set according to a simple perturbation;

selecting a second set of queries based at least in part on the errors of the second set perturbed according to the simple perturbation, wherein the errors of the second set calculated for each of the second set of queries and perturbed according to the simple perturbation have the greatest values of the errors of the second set;

calculating answers to each of the second set of queries using the set of private data;

perturbing the answers to each of the second set of queries according to a simple perturbation;

adding each of the second set of queries to the set of selected queries;

identifying differentiable queries corresponding to the set of selected queries, wherein each of the differentiable queries is differentiable over a domain including at least the second synthetic dataset;

determining answers to each of the differentiable queries corresponding to the set of selected queries using the second synthetic dataset; and determining a third synthetic dataset according to the optimization technique, wherein the third synthetic dataset is determined based at least in part on the answers to each of the differentiable queries corresponding to the set of selected queries perturbed according to the simple perturbation and answers to each of the set of selected queries determined using the second synthetic dataset.

7. The method of claim 6, further comprising:
receiving, from a user over one or more networks, a designation of a first number of iterations and a second number of queries per iteration,
wherein each of the first set of queries and the second set of queries is of the second number of queries, and
wherein a product of the first number and the second number is less than a third number of the plurality of queries.

8. The method of claim 5, wherein each of the errors of the first set is perturbed and the first set of queries is selected according to a report noisy max function.

9. The method of claim 5, wherein the optimization technique is a gradient descent variant or technique.

10. The method of claim 5, wherein the at least one simple perturbation comprises one of:
a Gaussian perturbation;
a Laplacian perturbation;
a Poisson perturbation; or
a random perturbation.

11. The method of claim 5, wherein the set of private data comprises at least one categorical feature having a predetermined number of data points within the domain, and
wherein the method further comprises:
embedding the at least one categorical feature into a plurality of binary features,
wherein a first binary feature of the plurality of binary features has a value of one, and
wherein each of the plurality of binary features other than the first binary feature has a value of zero.

12. The method of claim 11, wherein each of the differentiable queries corresponding to the set of selected queries is differentiable over the domain including at least the first synthetic dataset, and wherein answers to the set of selected queries determined according to the at least one categorical feature equal answers to the differentiable queries corresponding to the set of selected queries calculated according to the plurality of binary features.

13. The method of claim 5, further comprising:
causing a display of at least one user interface by a computer device of a user associated with the first set of data; and
receiving, from the computer device, at least one of:
a designation of one of the set of private data or a location of the set of private data;
a designation of a number of queries, wherein each of the first set of queries and the second set of queries has the number of queries; or
a selection of at least one of the plurality of queries.

14. The method of claim 5, further comprising:
receiving at least one privacy parameter from a computer device of a user associated with the set of private data, wherein the at least one privacy parameter comprises a privacy loss parameter $\epsilon$ and a failure probability parameter $\delta$,
wherein the method further comprises:
calculating a zero-concentrated differential privacy parameter calculated according to an equation $\epsilon = \rho + 2\sqrt{(\rho \log(1/\delta))}$,
wherein each of the first set of errors and each of the answers to each of the first set of queries is perturbed based at least in part on the zero-concentrated differential privacy parameter.

15. The method of claim 5, wherein the set of private data comprises:
identifiers of each of a plurality of individuals; and
at least one of:
identifiers of payment instruments, wherein each of the payment instruments is associated with one of the plurality of individuals;
identifiers of street addresses, wherein each of the street addresses is associated with one of the plurality of individuals;
identifiers of items, wherein each of the items was previously purchased by at least one of the plurality of individuals;
identifiers of insurance policies, wherein each of the insurance policies is associated with at least one of each of the plurality of individuals; or
identifiers of medical conditions, wherein each of the medical conditions is experienced by at least one of each of the plurality of individuals.

16. The method of claim 5, wherein each of the plurality of queries is of a common class of queries, and wherein the common class is one of:
a statistical query;
a linear query;
a counting query; or
a k-way marginal query.

17. The method of claim 5, wherein the set of private data is one of a text file, a Comma-Separated Value file, a Protocol Buffer file or a JavaScript Object Notation file comprising:
data regarding a plurality of customers of an electronic marketplace, wherein the data comprises:
identifiers of each of the plurality of customers and at least one of:
identifiers of payment instruments, wherein each of the payment instruments is associated with one of the plurality of customers;

identifiers of street addresses, wherein each of the street addresses is associated with one of the plurality of customers; or identifiers of items, wherein each of the items was previously purchased from the electronic marketplace by at least one of the plurality of customers.

18. A computer system programmed with one or more sets of instructions that, when executed, cause the computer system to execute a method comprising:

receiving information regarding private data, wherein the information comprises:
- at least one of a first set of data or a location of the first set of data, wherein the first set of data comprises the private data; and
- an identifier of at least one of a first plurality of queries, wherein each of the first plurality of queries is of a common class of queries;

identifying at least a first differential privacy parameter and a second differential privacy parameter for the first set of data;

calculating a third differential privacy parameter based at least in part on the first differential privacy parameter and the second differential privacy parameter;

determining a first number of iterations;

determining a second number of queries to be considered during each of the first number of iterations;

calculating a privacy budget based at least in part on the third differential privacy parameter, the first number of iterations and the second number of queries to be considered during each of the first number of iterations;

in a first iteration of the first number of iterations,
- identifying a first subset of the first plurality of queries to be considered during the first iteration;
- selecting a first query based at least in part on the first set of data, the first subset of queries, a first plurality of answers to the first subset of the first plurality of queries, and the privacy budget;
- adding the first query to a selected set of queries;
- identifying a first noisy answer to the first query calculated based at least in part on the first set of data and the privacy budget, wherein the first noisy answer is calculated according to a Gaussian perturbation; and
- generating a second set of data based at least in part on the first query, the first noisy answer and the first set of data;

in a second iteration of the first number of iterations,
- identifying a second subset of the first plurality of queries to be considered during the second iteration;
- selecting a second query based at least in part on the second set of data, the second subset of queries, a second plurality of answers to the second subset of the second plurality of queries, and the privacy budget;
- adding the second query to the selected set of queries;
- identifying a second noisy answer to the second query calculated based at least in part on the second set of data and the privacy budget, wherein the second noisy answer is calculated according to the Gaussian perturbation; and
- generating a third set of data based at least in part on the second query, the second noisy answer and the second set of data; and after at least the second iteration,
- storing at least the third set of data in at least one data store.

19. The computer system of claim 18, wherein the private data comprises at least one of:

first data regarding a plurality of customers of an electronic marketplace, wherein the first data comprises identifiers of each of the plurality of customers and identifiers of payment instruments associated with each of the plurality of customers; or second data regarding a plurality of patients of a health care facility, wherein the second data comprises identifiers of each of the plurality of patients and identifiers of at least one medical condition of each of the plurality of patients, and wherein selecting the first query of the first subset of queries comprises:

calculating answers to each of the first subset of queries based at least in part on the first set of data;

determining, according to a report noisy max function, that at least a third query of the first subset of the first plurality of queries has a greatest error of the first plurality of queries; and selecting the first query based at least in part on the third query, wherein the first query is an equivalent extended differentiable query for the third query.

20. The computer-implemented method of claim 18, wherein the first privacy parameter is a privacy loss parameter $\epsilon$, wherein the second privacy parameter is a failure probability parameter $\delta$, and wherein the third privacy parameter is a zero-concentrated differential privacy parameter calculated according to an equation $\epsilon = \rho + 2\sqrt{\rho \log(1/\delta)}$.

* * * * *